United States Patent
Li et al.

(10) Patent No.: US 11,070,285 B2
(45) Date of Patent: Jul. 20, 2021

(54) SYSTEM AND METHOD FOR CONFIGURING A MULTISTAGE INTERCONNECTION NETWORK BASED ON USER TRAFFIC DEMAND

(71) Applicant: THE BOEING COMPANY, Chicago, IL (US)

(72) Inventors: James Y. Li, Hawthorne, CA (US); Dimitri D. Thomas, Redondo Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 181 days.

(21) Appl. No.: 16/277,876

(22) Filed: Feb. 15, 2019

(65) Prior Publication Data

US 2020/0266884 A1 Aug. 20, 2020

(51) Int. Cl.
*H04L 12/24* (2006.01)
*H04B 7/185* (2006.01)
(Continued)

(52) U.S. Cl.
CPC ..... *H04B 7/18584* (2013.01); *H04B 7/18597* (2013.01); *H04L 41/0672* (2013.01);
(Continued)

(58) Field of Classification Search
CPC ........... H04B 7/18584; H04B 7/18597; H04W 24/04; H04W 28/0205; H04W 40/34; H04L 41/0672; H04L 43/0817
See application file for complete search history.

(56) References Cited

U.S. PATENT DOCUMENTS 8,001,583 B2   8/2011   Waizumi et al.
8,064,920 B2   11/2011  Bell et al.
(Continued)

OTHER PUBLICATIONS

Wang, "Distributed Diagnosis in Multistage Interconnection Networks", Journal of Parallel and Distributed Computing 61, 254-264 (2001), 11 pgs.

(Continued)

*Primary Examiner* — Edan Orgad
*Assistant Examiner* — Malick A Sohrab
(74) *Attorney, Agent, or Firm* — Moore Intellectual Property Law, PLLC

(57) ABSTRACT

A method includes obtaining traffic demand data indicating user traffic demand through a communication system including a multistage interconnection network. The method also includes generating first path data based on the traffic demand data. The first path data represents a configuration of components of the multistage interconnection network to provide traffic paths through the multistage interconnection network. The method includes selectively generating second path data based on a determination that a potential failure of the multistage interconnection network cannot be isolated, based on the traffic paths, to a single component. The second path data represents a modified configuration of the components to provide the traffic paths and test paths through the multistage interconnection network to facilitate isolation of the failure of the multistage interconnection network to the single component. The method also includes sending configuration data based on the second path data to initiate configuration of the multistage interconnection network.

20 Claims, 5 Drawing Sheets

(51) Int. Cl.
    *H04W 24/04*    (2009.01)
    *H04W 28/02*    (2009.01)
    *H04L 12/26*    (2006.01)
    *H04W 40/34*    (2009.01)
(52) U.S. Cl.
    CPC ......... *H04L 43/0817* (2013.01); *H04W 24/04* (2013.01); *H04W 28/0205* (2013.01); *H04W 40/34* (2013.01)

(56) References Cited

U.S. PATENT DOCUMENTS

| | | | |
|---|---|---|---|
| 9,210,181 | B1 | 12/2015 | Nandy et al. |
| 9,755,924 | B2 | 9/2017 | Le |
| 9,985,912 | B1* | 5/2018 | Wagh .................. H04L 49/1523 |
| 2003/0063839 | A1* | 4/2003 | Kaminski .......... H04Q 11/0005 385/17 |
| 2009/0323522 | A1* | 12/2009 | Deguchi ............. H04L 41/5054 370/228 |
| 2011/0219111 | A1 | 9/2011 | Shevenell |
| 2014/0119385 | A1 | 5/2014 | Hoffmeyer et al. |
| 2014/0376546 | A1 | 12/2014 | Miller et al. |
| 2016/0182359 | A1* | 6/2016 | Otomo .................... H04L 45/28 370/216 |
| 2017/0141840 | A1 | 5/2017 | Scott |
| 2018/0131561 | A1* | 5/2018 | Yadav ..................... H04L 49/00 |
| 2018/0241465 | A1 | 8/2018 | Scott et al. |

OTHER PUBLICATIONS

Narraway, et al., "Fault Diagnosis in Benes Switching Networks", IEE Proceedings, vol. 134, Pt. E, No. 2, Mar. 1987, pp. 78-86.
Agrawal, "Testing and Fault Tolerance of Multistage Interconnection Networks", 0018-9162/82/0400-0041S00.75 CS 1982 IEEE, Apr. 1982, pp. 41-53.
Benes, V.E. "Mathematical Theory of Connecting Network and Telephone Traffic", Academic Press, NY. 1965, pp. 1-335.
Clos, C. "A Study of Non-Blocking Switching Networks", The Bell System Technical Journal, vol. 32. 1953, pp. 406-424.

* cited by examiner

SYSTEM AND METHOD FOR CONFIGURING A MULTISTAGE INTERCONNECTION NETWORK BASED ON USER TRAFFIC DEMAND

FIELD

The present disclosure is generally related to communication systems, and more particularly to configuring a multistage interconnection network of a communication system.

BACKGROUND

Satellite-based networks are capable of transporting internet protocol (IP) traffic between subscriber devices, between external networks, or between a subscriber device and an external network. For example, a satellite may receive a first radio frequency (RF) signal including IP traffic at a receive antenna, perform "beam-to-beam" switching (e.g., route at least a portion of the RF signal from an input coupled to the receive antenna to an output coupled to a transmit antenna via a multistage interconnection network), and transmit a second RF signal including the IP traffic from the transmit antenna. The satellite acts as a switched network in that a communications path from an input to an output can be established and used to propagate communications data. When the communications path is no longer requested, the multistage interconnection network can be adjusted to terminate the current communications path (and establish another communications path). In this manner, the satellite enables the flow of IP traffic from a first device of a satellite-based network (or an external network) to a second device of the satellite-based network (or an external network).

Typically, failures of the multistage interconnection network are diagnosed by sending test packets through the multistage interconnection network. The testing of the multistage interconnection network can reduce bandwidth availability for routing user traffic.

SUMMARY

In a particular implementation, a method includes obtaining, at a first device, traffic demand data indicating user traffic demand through a communication system including the multistage interconnection network. The method also includes generating, at the first device, first path data based on the traffic demand data. The first path data represents a configuration of components of the multistage interconnection network to provide traffic paths through the multistage interconnection network to accommodate the user traffic demand. The method further includes selectively generating, at the first device, second path data based on a determination that a potential failure of the multistage interconnection network cannot be isolated, based on the traffic paths, to a single component of the multistage interconnection network. The second path data represents a modified configuration of the components of the multistage interconnection network to provide the traffic paths and test paths through the multistage interconnection network to facilitate isolation of the failure of the multistage interconnection network to the single component. The method also includes sending, from the first device to a second device, configuration data based on the second path data to initiate configuration of the multistage interconnection network.

In another particular implementation, a computer-readable storage device stores instructions that, when executed by a processor, cause the processor to perform operations including obtaining, at a first device, traffic demand data indicating user traffic demand through a communication system including a multistage interconnection network. The operations also include generating, at the first device, first path data based on the traffic demand data. The first path data represents a configuration of components of the multistage interconnection network to provide traffic paths through the multistage interconnection network to accommodate the user traffic demand. The operations further include selectively generating, at the first device, second path data based on a determination that a potential failure of the multistage interconnection network cannot be isolated, based on the traffic paths, to a single component of the multistage interconnection network. The second path data represents a modified configuration of the components of the multistage interconnection network to provide the traffic paths and test paths through the multistage interconnection network to facilitate isolation of the failure of the multistage interconnection network to the single component. The operations also include sending, from the first device to a second device, configuration data based on the second path data to initiate configuration of the multistage interconnection network.

In another particular implementation, a system includes a transmitter and a resource manager. The resource manager is configured to obtain traffic demand data indicating user traffic demand through a communication system including a multistage interconnection network. The resource manager is also configured to generate first path data based on the traffic demand data. The first path data represents a configuration of components of the multistage interconnection network to provide traffic paths through the multistage interconnection network to accommodate the user traffic demand. The resource manager is further configured to selectively generate second path data based on a determination that a potential failure of the multistage interconnection network cannot be isolated, based on the traffic paths, to a single component of the multistage interconnection network. The second path data represents a modified configuration of the components of the multistage interconnection network to provide the traffic paths and test paths through the multistage interconnection network to facilitate isolation of the failure of the multistage interconnection network to the single component. The resource manager is also configured to send, via the transmitter to a device, configuration data based on the second path data to initiate configuration of the multistage interconnection network.

DETAILED DESCRIPTION

Figure 1:
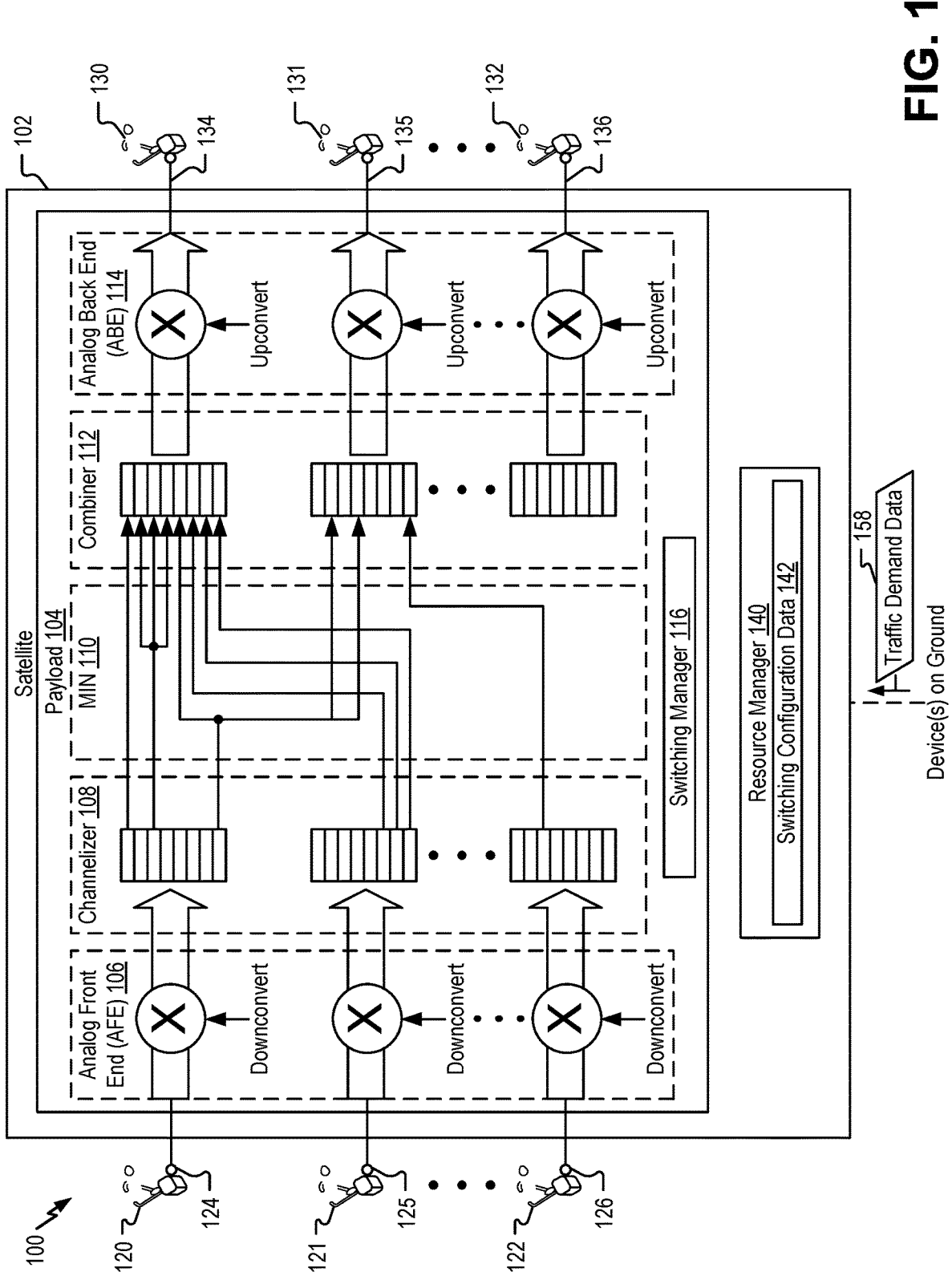
FIG. 1 is a block diagram that illustrates a first implementation of a system for configuring a multistage interconnection network based on user traffic demand.

Particular implementations are described with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining", "calculating", "generating", "adjusting", "modifying", etc. may be used to describe how one or more operations are performed. It should be noted that such terms are not to be construed as limiting and other techniques may be utilized to perform similar operations. Additionally, as referred to herein, "generating", "calculating", "using", "selecting", "accessing", and "determining" may be used interchangeably. For example, "generating", "calculating", or "determining" a parameter (or a signal) may refer to actively generating, calculating, or determining the parameter (or the signal) or may refer to using, selecting, or accessing the parameter (or signal) that is already generated, such as by another component or device. Additionally, "adjusting" and "modifying" may be used interchangeably. For example, "adjusting" or "modifying" a parameter may refer to changing the parameter from a first value to a second value (a "modified value" or an "adjusted value"). As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

Implementations disclosed herein are directed to systems, computer-readable mediums, and methods of operating a vehicle-based communications network that performs communications data routing on-board the vehicle based on network information to provide flexible peering with "adjacent" network devices. To illustrate, a satellite-based network (e.g., a vehicle-based network) includes a satellite that is configured to transport internet protocol (IP) traffic from a first device (e.g., a device of a first network on the ground, such as a customer edge router) to a second device (e.g., a device of a second network on the ground, such as a customer edge router). As described further herein, a satellite (or other vehicle) of the present disclosure is configured to perform on-board signal routing (due to configuration of a multistage interconnection network of the satellite) based on traffic demand data indicating user traffic demand.

To further illustrate, the satellite includes a multistage interconnection network that is configured to "switch" signals received at inputs (e.g., from input or uplink beams) of the satellite to outputs (e.g., to output or downlink beams) of the satellite for transmission to one or more ground-based (e.g., terrestrial) devices. As used herein, "switching" signals refers to routing signals (or portions thereof) through one or more switching elements of the multistage interconnection network, assigning signals (or portions thereof) to one or more timeslots (or frequencies in an optical implementation), or other operations that cause the signals (or portions thereof) to traverse one or more communications paths from the inputs to the outputs via the multistage interconnection network (and any other components of the satellite payload therebetween). The multistage interconnection network may include one or more physical switching elements, one or more optical switching elements, or one or more digital components (e.g., filters, etc.) configured to switch received signals (or portions thereof) from an input of the satellite to an output of the satellite. A resource manager (e.g., a processor, a controller, an application-specific integrated circuit (ASIC), a field-programmable gate array (FPGA), or other circuitry) associated with the satellite is configured to generate switching configuration data that is provided to the satellite in order to configure the multistage interconnection network. In a particular implementation, the resource manager is integrated in a ground-based operations center of the satellite-based network (e.g., a terrestrial network operations center) or in a ground-based gateway of the satellite-based network. In an alternate implementation, the resource manager is integrated on-board the satellite. The resource manager is further configured to receive traffic demand data indicating user traffic demand and to generate the switching configuration data based on the traffic demand data.

To illustrate, the satellite-based network may transport IP traffic between a first external network (e.g., a first ground-based network) and a second external network (e.g., a second ground-based network). The resource manager is configured to receive the traffic demand data indicating that traffic is to be shared between a first network node (e.g., a router) of the first external network and a second network node (e.g., a router) of the second external network. In some examples, the traffic demand data indicates that traffic is to be shared between various nodes of various networks. For example, the traffic demand data indicates that traffic is to be shared between a third network node and a fourth network node.

The resource manager is configured to generate the switching configuration data based on the traffic demand data to initialize or modify a first traffic path between the first network node and the second network node and a second traffic path between the third network node and the fourth network node. The resource manager is configured to generate one or more additional paths (e.g., test paths) to enable isolation of a failure of the multistage interconnection network to a single component. For example, the resource manager determines the additional paths such that each component is included in at least one path (e.g., a traffic path or a test path) and that no two components are included in an identical set of paths. The resource manager is configured to provide the switching configuration data to a switching manager. The switching manager is configured to perform configuration of the multistage interconnection network based on the switching configuration data. For example, the switching manager is configured to set up the traffic paths and the test paths.

The switching manager is configured to collect input performance metrics and output performance metrics of the multistage interconnection network. For example, the input performance metrics indicate a first input performance metric and a second input performance metric of a first input and a second input, respectively, of the multistage interconnection network. As another example, the output performance metrics indicate a first output performance metric and a second output performance metric of a first output and a second output, respectively, of the multistage interconnection network. An input performance metric of an input is based on at least one of a power measurement, a signal to noise ratio, a carrier to noise ratio, a received signal strength, a bit error rate, a symbol error rate, or an autocorrelation magnitude of the input. An output performance metric of an output is based on at least one of a power measurement, a signal to noise ratio, a carrier to noise ratio, a received signal strength, a bit error rate, a symbol error rate, or an autocorrelation magnitude of the output. In some examples, a performance metric of a component corresponds to traffic being routed through the component. In other examples, a performance metric of a component corresponds to noise passing through the component. For example, test data does not have to be sent through the test paths to collect the performance metrics.

The resource manager is configured to receive component performance metrics (e.g., the input performance metrics and the output performance metrics) of the multistage interconnection network from the switching manager. The resource manager is configured to identify failed paths, if any, of the multistage interconnection network based on the component performance metrics. For example, the resource manager is configured to determine path performance metrics of the paths (e.g., the traffic paths and the test paths) based on the component performance metrics. To illustrate, the switching configuration data indicates that the first traffic path includes the first input and the first output. The resource manager determines an input performance metric of the first traffic path based at least in part on the first input performance metric of the first input and determines an output performance metric of the first traffic path based at least in part on the first output performance metric of the first output. The resource manager determines whether the first traffic path failed based on determining whether the input performance metric of the first traffic path matches the output performance metric of the first traffic path.

Because the multistage interconnection network is configured such that each component is included in at least one path and no two components are included in identical paths, the resource manager is able to identify a faulty component based on analyzing the failed paths. For example, the resource manager identifies a component as faulty in response to determining that the component is indicated by the switching configuration data as included in most of the failed paths. The resource manager is configured to reset the faulty component or designate the faulty component as a failed component. The resource manager is configured to update the switching configuration data to route around the failed component and to provide the updated switching configuration data to the switching manager to update the configuration of the multistage interconnection network.

The resource manager of the present disclosure is thus able to isolate a failure of the multistage interconnection network to a single component by passively (e.g., without sending test packets) monitoring the performance metrics of the multistage interconnection network. The passive monitoring of the performance metrics does not adversely impact (e.g., reduce) the bandwidth of the multistage interconnection network available for user traffic.

FIG. 1 illustrates an example of a particular implementation of a system 100 for configuring a multistage interconnection network based on user traffic demand. As further described herein, configuration of a multistage interconnection network (MIN) 110 is based on traffic paths to accommodate user traffic demand and test paths to enable isolation of a failure of the MIN 110 (e.g., a switching matrix) to a single component.

The system 100 includes a satellite 102. The satellite 102 is part of a satellite-based communications network. Although described herein as a satellite, in other implementations, the system 100 includes a different vehicle. As used herein, a vehicle refers to a spacecraft or an aircraft and is distinct from ground-based (e.g., terrestrial) devices. To illustrate, a vehicle includes spacecraft, such as a satellite, a shuttle, etc., or an aircraft. In a particular implementation, the system 100 includes an unmanned aerial vehicle (UAV) (e.g., a drone aircraft).

The satellite 102 includes a payload 104 and one or more control systems (which are not illustrated for convenience). The one or more control systems include one or more processors, one or more controllers, dedicated hardware, or a combination thereof, that are configured to perform control operations for the satellite 102, such as power generation and control, thermal control, telemetry, altitude control, orbit control, or other control operations, as non-limiting examples.

The payload 104 is configured to provide communications services to users of a communication system (e.g., a satellite-based network) that includes the satellite 102. The communications services include data communications (e.g., internet protocol (IP) packet communications), telephone communications, Internet access, radio, television, other types of communications, or a combination thereof, as non-limiting examples. The payload 104 includes receive antennas (or receive antenna arrays), transmit antennas (or transmit antenna arrays), and circuitry therebetween (e.g., processing and routing circuitry between inputs and outputs of the satellite 102). To illustrate, the payload 104 includes a first receive antenna 120 coupled to a first input 124, a second receive antenna 121 coupled to a second input 125, a Nth receive antenna 122 coupled to a Nth input 126, a first transmit antenna 130 coupled to a first output 134, a second transmit antenna 131 coupled to a second output 135, and a Mth transmit antenna 132 coupled to a Mth output 136. In some implementations, the receive antennas 120-122 are included in one or more receive antenna arrays, and the transmit antennas 130-132 are included in one or more transmit antenna arrays. In some implementations, one or more of the receive antennas 120-122 are included in the same receive antenna array, one or more of the transmit antennas 130-132 are included in the same transmit antenna array, or both.

In the particular implementation illustrated in FIG. 1, the payload 104 includes three receive antennas and three transmit antennas (e.g., N and M are equal to 3). In other implementations, the payload 104 includes more than three or fewer than three receive antennas, and the payload 104 includes more than three or fewer than three transmit antennas. In some implementations, the number of receive antennas and the number of transmit antennas are the same (e.g., N is equal to M). In other implementation, the payload 104 includes more receive antennas than transmit antennas or fewer receive antennas than transmit antennas (e.g., N is not equal to M).

In addition to the receive antennas 120-122 and the transmit antennas 130-132, the payload 104 includes an analog front end (AFE) 106, the MIN 110, and an analog back end (ABE) 114. The AFE 106 includes circuitry, such as low noise amplifiers (LNAs), filters, mixers, analog-to-digital converters (ADCs), etc., configured to perform analog processing on RF signals received at the inputs 124-126 from the receive antennas 120-122 and to convert the RF signals to the digital domain. In a particular implementation, the AFE 106 includes N mixers configured to downconvert N RF signals to intermediate frequency (IF) signals for digital processing. The ABE 114 includes circuitry, such as power amplifiers (PAs) or driver amplifiers, filters, mixers, digital-to-analog converters (DACs), etc., configured to perform digital-to-analog conversion (e.g., to convert the IF signals to RF signals) and to perform analog processing on the RF signals prior to output from the outputs 134-136 to the transmit antennas 130-132.

The MIN 110 includes circuitry configured to route one or more outputs (or portions thereof) from the AFE 106 to the ABE 114 in order to route one or more signals (or portions thereof) from the inputs 124-126 to the outputs 134-136. To illustrate, the MIN 110 includes one or more switching elements (e.g., integrated circuits (ICs) that perform switching functionality, one or more optical switching elements, one or more microwave switching elements), other digital circuitry configured to perform routing and switching functionality (e.g., filters, application-specific integrated circuits (ASICs), field-programmable gate arrays (FPGAs), etc.), or a combination thereof. As an example, the MIN 110 includes a plurality of switching elements configured to couple one or more of the inputs 124-126 to one or more of the outputs 134-136. In a particular implementation, the MIN 110 includes a plurality of switch ASICs associated with a respective plurality of sub-bands and interconnected via a shared bus or other communications medium.

In some implementations, the payload 104 further includes a channelizer 108 and a combiner 112. The channelizer 108 includes digital circuitry configured to receive a digital representation of a sub-band spectrum received on an uplink beam at a receive antenna and to divide the sub-band spectrum into any number of equally or unequally sized frequency "slices". To illustrate, some satellites includes "transponders" (e.g., a RF receiver, frequency translating circuitry, and a RF transmitter) that are configured to receive RF signals within a particular frequency band from a terrestrial satellite station (or from another satellite), translate the RF signals to a second particular frequency band, and transmit the RF signals within the second frequency band to another terrestrial satellite station (or another satellite). Typical transponders are associated with 30-70 megahertz (MHz) frequency bands. In satellites that do not include the channelizer 108, the received beams (e.g., RF signals within the particular frequency bands) are downconverted and routed to outputs for upconversion and transmission via one or more downlink beams having different sub-band spectrum (e.g., different frequency bands having the same size as the receive frequency bands). This process is referred to as "beam-to-beam switching".

In some implementations, the satellite 102 is configured to route signals within finer granularity frequency bands than "transponder-sized" frequency bands (also referred to as "channels"). To illustrate, the channelizer 108 is configured to sub-divide the frequency bands (e.g., the sub-band spectrum) associated with the receive antennas 120-122 into smaller frequency slices, also referred to as "subchannels". For example, the channelizer 108 is configured to demultiplex one or more outputs of the AFE 106 into multiple slices (e.g., subchannels), and each slice (e.g., subchannel) is routed through the MIN 110. In a particular implementation, each subchannel is a sub-band of approximately 31 kilohertz (kHz). In other implementations, the subchannels have other sizes.

In the particular implementation illustrated in FIG. 1, the channelizer 108 is configured to divide each input beam spectrum (e.g., frequency band) from each of the inputs 124-126 into eight input subchannels (e.g., frequency slices). In other implementations, the channelizer 108 divides each input beam spectrum into more than eight or fewer than eight input subchannels. Although referred to as frequency slices or subchannels, in other implementations, signals may also be divided into time-based channels or subchannels (e.g., for time-division multiple access (TDMA) signals) or code-based channels or subchannels (e.g., for code-division multiple access (CDMA) signals). After being switched by the MIN 110, the subchannels are combined by the combiner 112. To illustrate, the combiner 112 includes circuitry configured to re-assemble the plurality of subchannels received from the MIN 110 into sub-bands for transmission via the transmit antennas 130-132. For example, the combiner 112 may be configured to combine a first plurality of subchannels into a first sub-band to be provided to the first output 134, to combine a second plurality of subchannels into a second sub-band to be provided to the second output 135, and to combine a Mth plurality of subchannels into a Mth sub-band to be provided to the Mth output 136.

In some implementations, the payload 104 includes a regenerator configured to perform further processing on digital data encoded in the various frequency slices/subchannels. For example, the regenerator may include a processor and a memory, a controller, one or more ASICs, one or more FPGAs, or other combinations of circuitry configured to demodulate the data, perform additional processing, and remodulate the data prior to transmission via the transmit antennas 130-132. The additional analysis includes access verification, encryption, code division multiplexing (e.g., CDMA), data regeneration (e.g., recovery of corrupt or unclear data), compression, packet switching, other data processing, or a combination thereof, as non-limiting examples. Demodulation and remodulation may occur at any suitable stage on-board the satellite 102. For example, demodulation may occur before or after channelization (e.g., via the channelizer 108), and remodulation may occur before or after combination (e.g., via the combiner 112).

In implementations that include the channelizer 108 and the combiner 112, the MIN 110 is configured to route the input subchannels from the respective inputs to assigned respective outputs. The MIN 110 may be configured to perform in-beam and/or cross-beam point-to-point switching (e.g., routing), in-beam and/or cross-beam multicast switching, in-beam and/or cross-beam broadcasting, or a combination thereof. As an illustrative example, the channelizer 108 may perform in-beam point-to-point switching by switching the first subchannel of the first input 124 to the first subchannel of the first output 134, and the channelizer 108 may perform cross-beam point-to-point switching by switching the third subchannel of the Nth input 126 to the eighth subchannel of the second output 135. As another illustrative example, the channelizer 108 may perform in-beam multicast switching by switching the third subchannel of the first input 124 to multiple subchannels (e.g., the second, third, and fourth subchannels) of the first output 134, and the channelizer 108 may perform in-beam and cross-beam multicast switching by switching the eighth subchannel of the first input 124 to the fifth subchannel of the first output 134 and to the second and fourth subchannels of the second output 135. The specific switching illustrated in FIG. 1 is for illustrative purposes and is not intended to be limiting. In other implementations, other switching is performed.

To control the configuration of the MIN 110, the satellite 102 includes a switching manager 116. In a particular implementation, the switching manager 116 includes dedicated circuitry, a processor, a controller, an ASIC, a FPGA, or a combination thereof, configured to control the configuration of the MIN 110. In other implementations, the operations of the switching manager 116 may be performed by a processor or other system on-board the satellite 102. The switching manager 116 is configured to initialize or modify the configuration of the MIN 110. For example, the switching manager 116 is configured to operate one or more switching elements of the MIN 110 (e.g., using control signals), to set filter coefficients or other parameters of the MIN 110, or a combination thereof. To illustrate, the switching manager 116 is configured to instantiate one or more permutation tables and to configure elements of the MIN 110 based on the one or more permutation tables. For example, each permutation table may indicate a different configuration of the switching elements within the MIN 110 such that one or more channels or subchannels (e.g., frequency slices) are routed from particular inputs to particular outputs. In some implementations, the switching manager 116 is configured to control the configuration of the MIN 110 (e.g., to instantiate permutation tables) based on information or instructions received from other components of the satellite 102 or from systems that are external to the satellite 102 (e.g., systems located on a different satellite or terrestrial systems), as further described herein.

The satellite 102 further includes a resource manager 140 configured to control configuration of one or more multi-stage interconnection networks of one or more vehicles. To illustrate, the resource manager 140 may control configuration of the MIN 110 to initialize or modify a communications path throughout the satellite 102. In some implementations, the resource manager 140 includes or corresponds to a digital payload resource manager (DPRM). Although illustrated as being integrated in the satellite 102, in other implementations, the resource manager 140 is external to the satellite 102 and configured to communicate with the satellite 102 via a satellite communications link, as further described with reference to FIG. 2. Although described with respect to generating switching configuration data for a single vehicle (e.g., the satellite 102), in other implementations, the resource manager 140 generates switching configuration data for multiple vehicles, as further described with reference to FIG. 2.

The resource manager 140 is configured to generate switching configuration data 142 to enable a particular routing of one or more signals (or frequency slices/subchannels) from one or more of the inputs 124-126 to one or more of the outputs 134-136. The switching configuration data 142 indicates states of one or more switching elements of the plurality of switching elements of the MIN 110 (e.g., the switching configuration data 142 includes one or more filter configurations or coefficients, one or more permutation tables, or a combination thereof, associated with routing one or more frequency slices associated with a RF signal received at one or more of the receive antennas 120-122 to one or more of the transmit antennas 130-132). To illustrate, the switching configuration data 142 may include a configuration of switching elements that causes a first subchannel associated with the first input 124 to be switched to a subchannel associated with the first output 134 and that causes a second subchannel associated with the first input 124 to be switched to a subchannel associated with the second output 135 (e.g., the switching configuration data 142 indicates a configuration that includes two communications paths), as a non-limiting example.

In some aspects, an input is switched to multiple outputs or multiple inputs are switched to the same output. For example, the switching configuration data 142 includes a configuration of switching elements that causes the first input 124 to be switched to the first output 134 and to the second output 135 and that causes the second input 125 to also be switched to the first output 134 (e.g., the switching configuration data 142 indicates a configuration that includes communications paths from the same input to multiple outputs, and communications paths from multiple inputs to the same output).

To enable configuration (or reconfiguration) of the MIN 110, the resource manager 140 is configured to send the switching configuration data 142 to the switching manager 116. To illustrate, the resource manager 140 is configured to send the switching configuration data 142 to the switching manager 116 via a bus (or other on-board communications medium). In alternate implementations in which the resource manager 140 is external to the satellite 102, the resource manager 140 is configured to send the switching configuration data 142 to the switching manager 116 of the satellite 102 via a wireless feederlink (or other satellite communications medium). In a particular implementation, the resource manager 140 is configured to send the switching configuration data 142 via a transmitter to the switching manager 116 and the switching manager 116 is configured to receive the switching configuration data 142 via a receiver from the resource manager 140.

The switching configuration data 142 may be based on traffic demand data 158. To illustrate, the resource manager 140 is configured to receive traffic demand data 158 associated with a communications path from a first device to a second device. The communications path includes components of the payload 104 of the satellite 102. As a particular example, the communications path corresponds to a communications path between a first device (e.g., a mobile device, a computing device, a customer edge router, etc.) of a first external network and a second device (e.g., a mobile device, a computing device, a customer edge router, etc.) of a second external network via the MIN 110 (and one or more other components).

The traffic demand data 158 may be received from device(s) on the ground (e.g., a terrestrial device) via a satellite connection, such as a wireless feederlink. The device(s) include devices of one or more external networks (e.g., customer edge routers of networks communicatively coupled to the satellite-based network), devices of a Tier-2 operator that purchases or leases capacity and access to the satellite-based network, or devices of the satellite-based network (e.g., the operations center or another device, such as a gateway, that are configured to communicate via satellite communications), as non-limiting examples. To illustrate, as further described with reference to FIG. 2, the communications path may include a path from a device of a first external network to a device of a second external network via a satellite-based network that includes the satellite 102. The satellite-based network includes at least one terrestrial transmitter configured to transmit an uplink beam to the satellite 102, at least one terrestrial receiver configured to receive a downlink beam from the satellite 102, or a combination thereof. The communications path traverses at least one receive antenna of the satellite 102, on-board components of the payload 104 including the MIN 110, and at least one transmit antenna of the satellite 102.

In a particular implementation, the traffic demand data 158 includes a request for establishing the communications path. For example, the traffic demand data 158 may include or correspond to a request to establish a new communications path from a first device of the first external network to a second device of the second external network via components of the satellite 102, such as the AFE 106, the channelizer 108, the MIN 110, the combiner 112, and the ABE 114. In another particular implementation, the traffic demand data 158 includes a request for modifying an existing communications path. For example, the traffic demand data 158 may include or correspond to a request to modify the communications path from the first device of the first external network to the second device of the second external network by causing the communications path to traverse one or more different components of the payload 104 (e.g., to be received via a different receive antenna, to be transmitted via a different transmit antenna, etc.). In another particular implementation, the traffic demand data 158 includes a request for terminating the communications path. For example, the traffic demand data 158 may include or correspond to a request to terminate a particular communications path, and the resources used to provide the communications path may be reconfigured to provide other communications paths based on other requests.

In some implementations, the traffic demand data 158 is received from a network operator. For example, a network operator of an external network sends the traffic demand data 158 to the satellite-based network associated with the satellite 102, and the traffic demand data 158 is forwarded to the satellite 102. In other implementations, the traffic demand data 158 is generated based on data communications received at the satellite-based network. For example, a component of the satellite-based network may generate the traffic demand data 158 responsive to receiving a data packet that indicates the first device as the originator and that indicates the second device as the destination. In this manner, the satellite-based network may be configured to provide automatic communications path instantiation (e.g., without being configured by a human network operator).

In some implementations, the resource manager 140 receives the traffic demand data 158 from an operator at the operations center. In a particular implementation, the traffic demand data 158 includes first traffic demand data received from a first network operator (or a first component) of a first external network and second traffic demand data received from a second network operator (or a second component) of a second external network.

In a particular implementation, the resource manager 140 is configured to generate the traffic demand data 158 based on network traffic patterns. To illustrate, the resource manager 140 is configured to monitor user data propagated within the satellite-based network to generate the traffic demand data 158 indicating the user plane traffic patterns. Based on the traffic demand data 158, the resource manager 140 generates the switching configuration data 142. For example, the resource manager 140 may determine a first configuration of the MIN 110 to account for periods of high traffic associated with a particular user or group of users, and the resource manager 140 may determine a second configuration of the MIN 110 to account for periods of less traffic. Thus, the resource manager 140 generates the switching configuration data 142 to indicate one or more network-traffic-based configurations of the MIN 110.

During operation, the resource manager 140 receives the traffic demand data 158 indicating user traffic demand. Based on the traffic demand data 158, the resource manager 140 generates the switching configuration data 142, as further described with reference to FIG. 3. For example, the resource manager 140 generates the switching configuration data 142 to include traffic paths and test paths such that the user traffic demand is accommodated, each component of the MIN 110 is included in at least one path, and no two components of the MIN 110 are included in an identical set of paths. In a particular implementation, the switching configuration data 142 indicates a configuration of the MIN 110 that accommodates the user traffic demand and enables isolation of a failure of the multistage interconnection network to a single component, as further described with reference to FIG. 3. The resource manager 140 sends the switching configuration data 142 to the switching manager 116, and the switching manager 116 configures the MIN 110 based on the switching configuration data 142. Configuration of the MIN 110 enables switching of signals from the receive antennas 120-122 to the transmit antennas 130-132 to enable data routing via the satellite 102. The switching manager 116 sends component performance metrics of the MIN 110 to the resource manager 140. For example, the switching manager 116 sends the component performance metrics via a transmitter and the resource manager 140 receives the component performance metrics via a receiver. As another example, the resource manager 140 receives the component performance metrics via a bus (or other on-board communications medium) from the resource manager 140. The resource manager 140 identifies failed paths, if any, of the MIN 110 based on the component performance metrics, as further described with reference to FIG. 4. The resource manager 140 identifies a faulty component based on the failed paths, as further described with reference to FIG. 4. For example, the resource manager 140 designates a component that is included in the most of the failed paths as the faulty component.

By generating switching configuration data such that each component is included in at least one path and no two components are included in an identical set of paths, the resource manager 140 is able to isolate a failure of the multistage interconnection network to a single component by identifying the component that is included in most of the failed paths. Because the switching manager 116 passively generates the component performance metrics, the faulty component can be identified without adversely affecting the availability of the bandwidth of the MIN 110 for user traffic.

By generating the switching configuration data 142 based on the traffic demand data 158, the resource manager 140 enables automated configuration of the MIN 110. FIG. 1 thus illustrates an implementation of a satellite (e.g., the satellite 102) in which the data plane (e.g., the AFE 106, the channelizer 108, the MIN 110, the combiner 112, and the ABE 114) and the control plane (e.g., the switching manager 116 and the resource manager 140 that generates the switching configuration data 142) are co-located on-board the satellite 102. In other implementations, the data plane may be located on the ground (e.g., in a ground-based operations center), which enables satellites that do not perform on-board resource management functionality to configure the MIN 110 under control of one or more ground-based components, as further described with reference to FIG. 2.

In the above description, various functions performed by the system 100 of FIG. 1 are described as being performed by the components 106, 108, 110, 112, 114, 116, and 140. This is for illustration only. In other implementations, one or more of the components 106, 108, 110, 112, 114, 116, and 140 may be integrated in a single component that performs functions associated with multiple components. Each of the components 106, 108, 110, 112, 114, 116, and 140 may be implemented using hardware (e.g., a field-programmable gate array (FPGA) device, an application-specific integrated circuit (ASIC), a digital signal processor (DSP), a controller, etc.), software (e.g., instructions executable by a processor), or a combination thereof.

Figure 2:
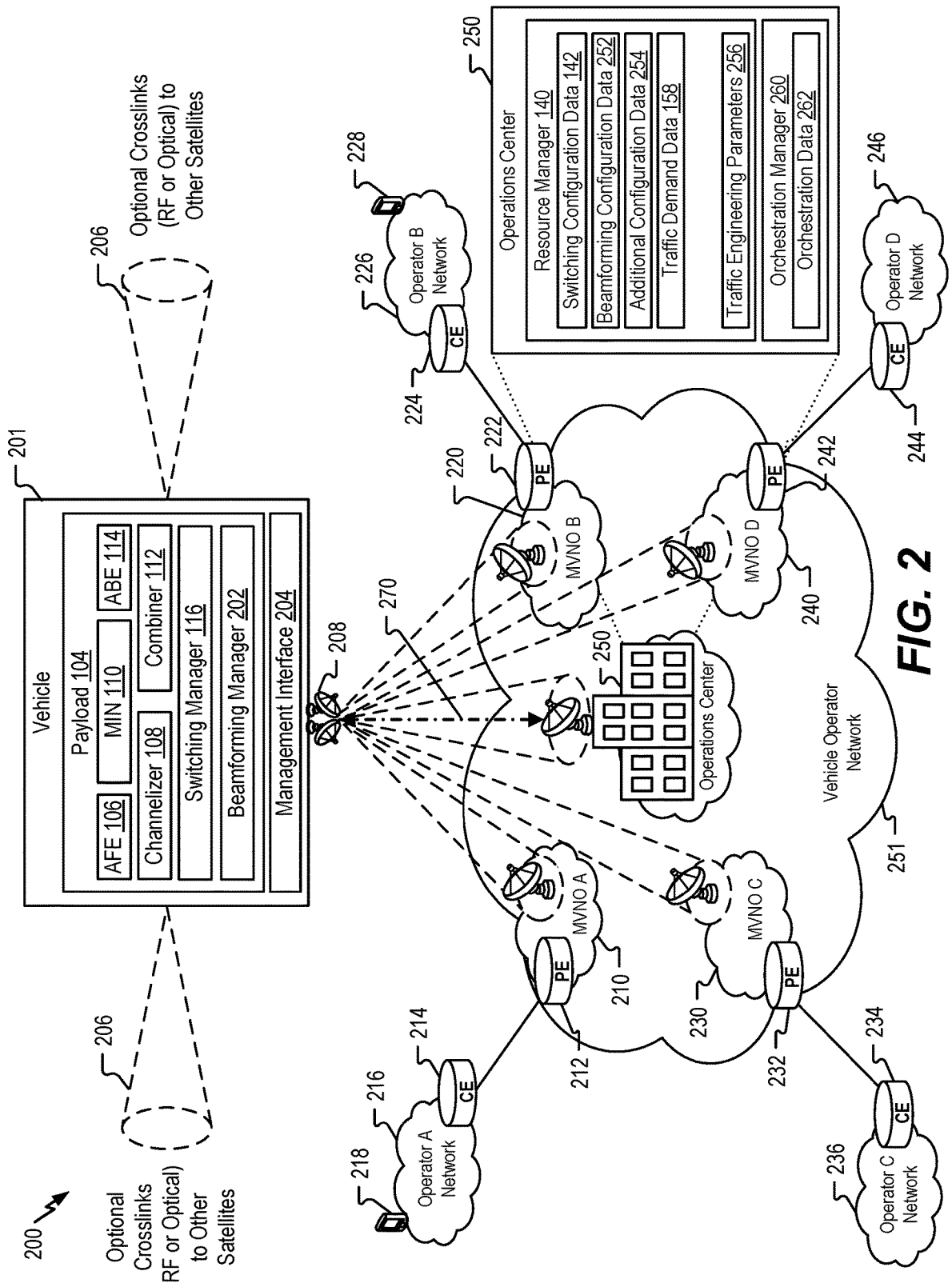
FIG. 2 is a diagram that illustrates a second implementation of a system for configuring a multistage interconnection network based on user traffic demand.

FIG. 2 depicts an example of a particular implementation of a system 200 including a vehicle-based network that includes a multistage interconnection network on-board a vehicle. The multistage interconnection network is configured based on user traffic demand. The system 200 includes a vehicle 201, a vehicle operator network 251 (e.g., a vehicle-based network), a first external network 216 ("Operator A Network"), a second external network 226 ("Operator B Network"), a third external network 236 ("Operator C Network"), and a fourth external network 246 ("Operator D Network"). Although four external networks are illustrated in FIG. 2, in other implementations, the system 200 includes fewer than four or more than four external networks. The vehicle operator network 251 includes or corresponds to a core network.

The vehicle 201 includes a spacecraft or an aircraft and is distinct from ground-based (e.g., terrestrial) devices, such as devices of the external networks 216, 226, 236, and 246 and other devices of the vehicle operator network 251. In a particular implementation, the vehicle 201 includes a satellite. In another particular implementation, the vehicle 201 includes a space shuttle. In another particular implementation, the vehicle 201 includes a UAV (e.g., a drone aircraft). Although illustrated in FIG. 2 as including a single vehicle, in other implementations, the system 200 includes a plurality of vehicles (e.g., a constellation of vehicles).

In a particular implementation, the vehicle 201 includes the payload 104 including the AFE 106, the channelizer 108, the MIN 110, the combiner 112, the ABE 114, and the switching manager 116, as described with reference to FIG. 1. In other implementations, one or more of the components 106, 108, 112, and 114 are not included in the vehicle 201. The payload 104 also includes antenna arrays 208. The antenna arrays 208 include multiple receive antennas and multiple transmit antennas. In a particular implementation, the antenna arrays 208 include the receive antennas 120-122 and the transmit antennas 130-132 as described with reference to FIG. 1.

The payload 104 further includes a beamforming manager 202. The beamforming manager 202 is configured to perform beamforming with respect to one or more output beams at outputs of the vehicle 201, one or more input beams at inputs of the vehicle 201, or a combination thereof. For example, the beamforming manager 202 may control the phase or amplitude of signals that are provided to various outputs to change a direction or shape of a transmit beam generated by one or more transmit antennas. As another example, the beamforming manager 202 may control the phase or amplitude of signals that are received at various inputs to change a direction or shape of a receive beam received by one or more receive antennas. To illustrate, the beamforming manager 202 performs one or more beamforming operations (e.g., the beamforming manager 202 modifies a phase or amplitude of one or more signals) based on beamforming weights, phase values, amplitude values, or other information received from the resource manager 140.

The vehicle 201 further includes a management interface 204. The management interface 204 is configured to provide network data associated with the components of the vehicle 201, such as components of the payload 104, to a ground-based operations center 250, to a ground-based network device (e.g., one or more terrestrial devices of the networks 216, 226, 236, 246, and 251), or both. For example, the management interface 204 may be configured to provide network-specific or operator-specific measurement data (e.g., data measuring communications operations performed by the vehicle 201 that include signals and data from the network or provider), ephemeris data, or both, to devices of one or more of the networks 216, 226, 236, and 246, or to provide vehicle-centric measurement data (e.g., data measuring communications operations associated with the vehicle-based network, such as component performance metrics), ephemeris data, or both, to the ground-based operations center 250.

The vehicle 201 is configured to support the vehicle operator network 251 by receiving RF signals in one or more uplink beams from the ground and transmitting RF signals to another location on the ground (or to one or more other vehicles) via one or more downlink beams. In some implementations, the vehicle 201 is configured to transmit downlink beams to one or more other vehicles (e.g., satellites, shuttles, drone aircraft, etc.) via optional crosslinks 206. The optional crosslinks 206 include RF crosslinks or optical crosslinks. Communicating via the optional crosslinks 206 with other vehicles enables the system 200 to include multiple vehicles, which may enable the vehicle operator network 251 to have expanded coverage area as compared to using a single vehicle. For example, each vehicle within the vehicle operator network 251 has an area of coverage that contributes to the total coverage area of the vehicle operator network 251.

The vehicle operator (e.g., a Tier-1 operator) may sell access or lease access to the vehicle operator network 251 to other closed user groups ("CUGs") to provide various network services. As used herein, "CUGs" refers to Tier-2 operators (e.g., service providers) that pay for access to equipment associated with a Tier-1 operator. For convenience, a member of a CUG is referred to as a user. Tier-2 operators include mobile virtual network operators (MVNOs) and virtual network operators (VNOs), as non-limiting examples. A person who subscribes to a service provided by a Tier-2 operator is referred to herein as a subscriber. In the particular implementation illustrated in FIG. 2, access is sold or leased to a first MVNO 210 ("MVNO A") associated with a first Tier-2 operator (Operator A) that operates the first external network 216, a second MVNO 220 ("MVNO B") associated with a second Tier-2 operator (Operator B) that operates the second external network 226, a third MVNO 230 ("MVNO C") associated with a third Tier-2 operator (Operator C) that operates the third external network 236, and a fourth MVNO 240 ("MVNO D") associated with a fourth Tier-2 operator (Operator D) that operates the fourth external network 246. Although described as MVNOs, in other implementations, different types of Tier-2 operators (e.g., VNOs, the government, etc.) are included. Although four Tier-2 operators are illustrated in FIG. 2, in other implementations, more than four or fewer than four Tier-2 operators may purchase or lease access to the vehicle operator network 251.

Components of the vehicle operator network 251 and the external networks 216, 226, 236, and 246 are configured to send and receive data traffic. For example, the vehicle operator network 251 includes a first provider edge router 212 configured to communicate with a first customer edge router 214 of the first external network 216, a second provider edge router 222 configured to communicate with a second customer edge router 224 of the second external network 226, a third provider edge router 232 configured to communicate with a third customer edge router 234 of the third external network 236, and a fourth provider edge router 242 configured to communicate with a fourth customer edge router 244 of the fourth external network 246. Although illustrated as four distinct provider edge routers 212, 222, 232, and 242, in other implementations, the vehicle operator network 251 includes more than four or fewer than four provider edge routers. For example, a single provider edge router may communicate with each of the customer edge routers 214, 224, 234, and 244.

For example, when data traffic is to be sent to the vehicle operator network 251, the first customer edge router 214 forwards the data traffic to the first provider edge router 212. The first provider edge router 212 may route the data traffic through components of the vehicle operator network 251 to the vehicle 201 for transmission to a different location. For example, the data traffic may be routed to a gateway router that is coupled to a satellite dish or other component configured to transmit an uplink beam that includes the data traffic to the vehicle 201.

The data traffic may be routed through components of the vehicle 201, such as the MIN 110, and transmitted to a satellite dish (or other component) coupled to a second gateway router at a different location via a downlink beam from the vehicle 201. The data traffic may be routed through additional components of the vehicle operator network 251 to the second provider edge router 222. In a particular implementation, the second provider edge router 222 is configured to provide the data traffic to the second customer edge router 224, which is configured to route the data traffic to its destination within the second external network 226.

In a particular implementation, a gateway router may include a plurality of modem banks and may receive first traffic associated with the first MVNO 210 at a first modem bank and second traffic associated with the second MVNO 220 at the second modem bank. The first modem bank generates a first signal within a first frequency band based on the first traffic and the second modem bank generates a second signal within a second frequency band based on the second traffic. The first signal and the second signal are combined into an uplink beam that is transmitted to the vehicle 201. As described with reference to FIG. 1, the MIN 110 is configured, based on the switching configuration data 142, to switch the first signal along a first communications path and to switch the second signal along a second communications path. The switching configuration data 142 is generated based on the traffic demand data 158.

To control the vehicle 201, the vehicle operator network 251 includes the ground-based operations center 250. In the particular implementation illustrated in FIG. 2, the resource manager 140 is integrated within or included in the ground-based operations center 250. For example, the ground-based operations center 250 includes one or more computing systems (e.g., one or more processors and memories) configured to perform the operations described with reference to the resource manager 140. In other implementations, the resource manager 140 is distributed among multiple components of the vehicle operator network 251 (instead of being located only at the ground-based operations center 250). To illustrate, resource manager clients may be included in multiple resource gateways, as well as the ground-based operations center 250, such that performance of the operations of the resource manager 140 is distributed across the resource gateways and the ground-based operations center 250. In a particular implementation, the ground-based operations center 250 is configured to generate control data for operating the vehicle 201 and the functions of the resource manager 140 are distributed across the resource gateways and are not performed by the ground-based operations center 250. As described with reference to FIG. 1, the resource manager 140 is configured to generate the switching configuration data 142 based on the traffic demand data 158.

The ground-based operations center 250 is communicatively coupled to the vehicle 201 via a wireless communications link 270, also referred to as a wireless feederlink. The wireless communications link 270 includes a RF link or a microwave link, as non-limiting examples. In implementations in which the vehicle 201 is a satellite, the wireless communications link 270 is a satellite communications link. The resource manager 140 is configured to transmit control and management data to the vehicle 201 via the wireless communications link 270. The control and management data is distinct from the data traffic that is included in one or more uplink beams sent to the vehicle 201 from a first location (or first group of locations) on the ground and that is to be routed on-board the vehicle 201 and transmitted as part of one or more downlink beams to a second location (or second group of locations) on the ground. For example, the resource manager 140 is configured to send the switching configuration data 142 to the vehicle 201 via the wireless communications link 270, and the switching manager 116 is configured to control the MIN 110 based on the switching configuration data 142, as described with reference to FIG. 1.

To illustrate, the MIN 110 may be configured based on the switching configuration data 142 to initialize or modify a communications path between a first device and a second device. In a particular implementation, the first device is a first ground-based device that is communicatively coupled to a first network associated with a first provider and the second device is a second ground-based device that is communicatively coupled to a second network associated with a second provider. For example, the first device may include a first subscriber device 218 that is communicatively coupled to the first external network 216 of Operator A and the second device may include a second subscriber device 228 that is communicatively coupled to the second external network 226 of Operator B. The first device and the second device may include mobile devices, such as mobile phones, tablet computers, laptop computers, smart watches, media playback devices, navigation systems, personal digital assistants (PDAs), satellite phones, vehicles (or components thereof), or a combination thereof, as non-limiting examples, or stationary computerized devices. As another example, the first device may include the first customer edge router 214 and the second device may include the second customer edge router 224 (e.g., routing among the networks 216 and 226 may not be visible to the vehicle operator network 251, for example because the networks 216, 226, and 251 interact according to a partial peering model). The first provider may be a first virtual network operator (e.g., may operate the first MVNO 210) that is associated with a first VRF instance and the second provider may be a second virtual network operation (e.g., may operate the second MVNO 220) that is associated with a second VRF instance. The MIN 110 may be configured based on the switching configuration data 142 such that a first output beam that is generated at a first transmit antenna of the vehicle 201 is based on at least a portion of a frequency spectrum of a first receive beam at a first receive antenna of the vehicle 201 (e.g., a communications path associated with a particular subchannel may be set from a particular input through the MIN 110 to a particular output). Switching data that initializes (or modifies) additional communications paths may be generated based on the switching configuration data 142. For example, the switching configuration data 142 may indicate one or more traffic paths, one or more test paths, or a combination thereof, as further described with reference to FIG. 3.

In a particular implementation, the resource manager 140 is further configured to generate beamforming configuration data 252. The beamforming configuration data 252 indicates one or more beamforming weights based on one or more phase values, one or more amplitude values, or a combination thereof. The resource manager 140 is configured to send the beamforming configuration data 252 to the vehicle 201 via the wireless communications link 270, and the beamforming manager 202 is configured to adjust RF signals to be output by the vehicle 201 (e.g., by adjusting phase or amplitude of the RF signals) based on the beamforming configuration data 252. Adjusting the RF signals is also referred to as applying the beamforming weights to the RF signals. By applying the beamforming weights to the RF signals, RF signals associated with different providers, with different traffic types or criteria, or a combination thereof, can be beamformed in different ways (e.g., having different directions, beam shapes, etc.) from the antenna array 208 (e.g., from one or more transmit antennas).

In another particular implementation, the resource manager 140 is configured to generate additional configuration data 254 based on the traffic demand data 158. The additional configuration data 254 indicates configurations or parameter values associated with one or more other components of the payload 104 (e.g., components other than the MIN 110). For example, the one or more components may include the AFE 106, the channelizer 108, the combiner 112, the ABE 114, a regenerator, or a combination thereof. The resource manager 140 is configured to send the additional configuration data 254 to the vehicle 201 via the wireless communications link 270, and circuitry of the vehicle 201 is configured to configure one or more other components of the payload 104 based on the additional configuration data 254. Configuring the one or more components may adjust bandwidth, power, frequency plans, antenna coverages, etc., associated with signals received at and transmitted from the antenna array 208. For example, adjusting filter coefficients or local oscillator signals associated with the AFE 106 or the ABE 114 adjusts the bandwidths of received signals that are processed or the bandwidths of signals that are transmitted from the vehicle 201. As another example, adjusting parameters of the channelizer 108 or the combiner 112 adjusts the number of subchannels that are subdivided from each signal, the width of the subchannels, the particular ranges for each subchannel, the number of subchannels that are combined to form an output channel, the width of the output channels, the ranges of the output channels, or a combination thereof. As another example, adjusting parameters associated with one or more amplifiers of the ABE 114 adjusts the energy (e.g., transmit power) of signals that are transmitted from the vehicle 201.

In another particular implementation, the resource manager 140 is configured to receive one or more traffic engineering parameters 256 from devices of the networks 216, 226, 236, 246, and 251. The one or more traffic engineering parameters 256 include a QoS parameter, a network-specific policy parameter, other speed or reliability parameters, or a combination thereof. The resource manager 140 is further configured to generate the switching configuration data 142 based on the one or more traffic engineering parameters 256. For example, the one or more traffic engineering parameters 256 may indicate a QoS type associated with particular data traffic (e.g., video, voice, data, etc.), and the resource manager 140 may generate the switching configuration data 142 such that a communications path for the particular data meets criteria (e.g., reliability, number of links, redundancy, end-to-end travel time, etc.) associated with the corresponding QoS type. As a particular example, the resource manager 140 may generate a permutation table that switches first data traffic (associated with one or more subchannels) from a first input to a second output along a first communications path and that switches second data traffic (associated with one or more other subchannels) from the first input to a first output along a second communications path. The first communications path may include an amplifier having a higher output voltage and a transmit antenna having a particular shaped beam such that the first communications path is associated with higher reliability than the second communications path (which includes an amplifier with a lower output voltage and a transmit antenna having a differently shaped beam).

In another particular implementation, the ground-based operations center 250 includes an orchestration manager 260. The orchestration manager 260 is configured to generate orchestration data 262 based on operation of the vehicle 201. To illustrate, the orchestration data 262 indicates one or more orchestrated events associated with operation of the vehicle 201, such as a handover from the vehicle 201 to a second vehicle, a planned outage associated with the vehicle 201, an unplanned outage associated with the vehicle 201, a change in orbit of the vehicle 201, a change in system capacity demand associated with the vehicle 201, a change in user attachment point associated with the vehicle 201, or a combination thereof. The orchestration manager 260 is configured to generate the orchestration data 262 based on commands from an operator (e.g., a human operator) at the ground-based operations center 250 or autonomously based on data generated by the vehicle 201 or the ground-based operations center 250. As a particular example, an operator may input data at the ground-based operations center 250 indicating that an outage is to occur at a particular time. As another particular example, the orchestration manager 260 may receive sensor data from the vehicle 201 indicating that the orbit of the vehicle 201 has changed or data from the ground-based operations center 250 indicating that an estimated link quality of an uplink or a downlink has changed (e.g., due to weather conditions or other measurable conditions). The resource manager 140 is configured to generate the switching configuration data 142 based further on the orchestration data 262. For example, a communications path from a first input to a first output may be modified such that the communications path extends from the first input to a different output based on the orchestration data 262 indicating a potential change in condition associated with a transmit antenna coupled to the first output. As another example, if the orchestration data 262 indicates an upcoming planned outage, the switching configuration data 142 may be modified to include a permutation table that enables only signals associated with high priority traffic types (e.g., high priority QoS types) to be routed to outputs until after the planned outage.

The system 200 enables abstraction and encapsulation of switching control at the vehicle 201. For example, the resource manager 140 is configured to translate traffic demand data into configurations of the MIN 110. In this manner, the resource manager 140 is able to control the configuration of the MIN 110 (which acts as a circuit-switched network) based on user traffic demand. To illustrate, the resource manager 140 generates the switching configuration data 142 to control the MIN 110 of the vehicle (or multistage interconnection networks of a plurality of vehicles) to accommodate the user traffic demand and to enable isolation of a failure of the MIN 110 to a single component.

FIG. 2 thus depicts an implementation in which the control plane (e.g., the resource manager 140) is "decoupled" from the data plane (e.g., the AFE 106, the channelizer 108, the MIN 110, the combiner 112, and the ABE 114) and located on the ground. Because the resource manager 140 is integrated in the ground-based operations center 250, the vehicle 201 is removed from the control plane. Thus, in the implementation illustrated in FIG. 2, the ground-based operations center 250 (including the resource manager 140) is able to control legacy vehicles (e.g., legacy satellites or other vehicles) to cause the legacy vehicles to configure the MIN 110 based on user traffic demand. For example, a legacy satellite (e.g., a satellite that includes the AFE 106, the channelizer 108, the MIN 110, the combiner 112, and the ABE 114 but that is not configured to perform on-board generation of the switching configuration data 142 based on the traffic demand data 158) can be configured to receive the switching configuration data 142 (and other configuration data described with reference to FIG. 2) and configure the MIN 110 (or other components of the payload 104) accordingly. Thus, in some implementations, the present disclosure enables legacy vehicle-based networks to configure the MIN 110 to enable accommodation of the user traffic demand and to enable isolation of a potential failure of the MIN 110 to a single component.

Figure 3:
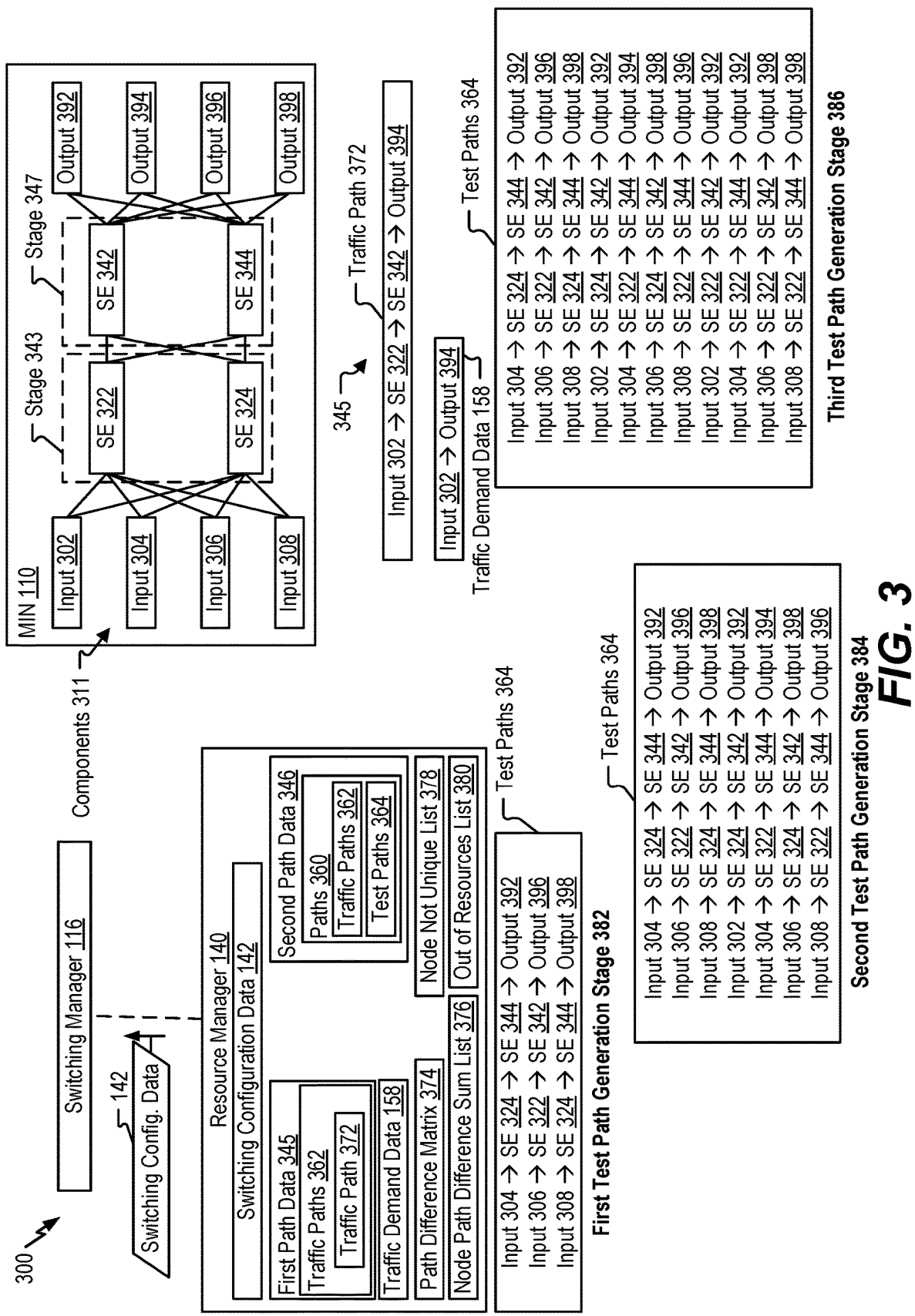
FIG. 3 is a diagram that illustrates an example of configuring a multistage interconnection network based on user traffic demand.

FIG. 3 depicts an illustrative example 300 of configuring a multistage interconnection network based on user traffic demand. The MIN 110 includes a plurality of components 311. In the example 300, the components 311 include a plurality of inputs (e.g., an input 302, an input 304, an input 306, and an input 308), a plurality of stages of switching elements (e.g., a stage 343 including a switching element 322 and a switching element 324 and a stage 347 including a switching element 342 and a switching element 344), a plurality of outputs (e.g., an output 392, an output 394, an output 396, and an output 398), a first plurality of links between the plurality of inputs and the stage 343, a second plurality of links between the stage 343 and the stage 347, and a third plurality of links between the stage 347 and the plurality of outputs.

Each of the inputs 302-308 is coupled via a link to each of the switching elements 322-324 of the stage 343. For example, the input 302 is coupled via a first link and a second link to the switching element 322 and the switching element 324, respectively. As another example, the input 304 is coupled via a third link and a fourth link to the switching element 322 and the switching element 324, respectively.

Each of the switching elements 322-324 of the stage 343 is coupled via a link to the switching element 342 or the switching element 344 of the stage 347. For example, the switching element 322 is coupled via a first link and a second link to the switching element 342 and the switching element 344, respectively. As another example, the switching element 324 is coupled via a third link and a fourth link to the switching element 342 and the switching element 344, respectively.

Each of the switching element 342 and the switching element 344 of the stage 347 is coupled via a link to the outputs 392-398. For example, the switching element 342 is coupled via a first link to the output 392 and the switching element 344 is coupled via a second link to the output 392. As another example, the switching element 342 is coupled via a third link to the output 394 and the switching element 344 is coupled via a fourth link to the output 394.

It should be understood that the described configuration of the MIN 110 (e.g., four inputs, two stages of two switching elements each, and four outputs) is provided as an illustrative example. In other examples, the MIN 110 includes more than four inputs, fewer than four inputs, more than two stages of switching elements, fewer than two stages of switching elements, more than two switching elements in a stage, fewer than two switching elements in a stage, different number of switching elements in different stages, more than four outputs, fewer than four outputs, or a combination thereof.

The switching manager 116 is configured to activate, based on the switching configuration data 142, a link to form a connection, as described herein. For example, the switching configuration data 142 includes a matrix (e.g., of 0s and 1s) indicating which links are to be activated and which links are to be deactivated. The switching manager 116 is configured to activate or deactivate the corresponding links. In a particular implementation, activating a first link between a first component (e.g., the switching element 322) and a second component (e.g., the switching element 344) corresponds to activating an output of the first component that is coupled to the first link and activating an input of the second component that is coupled to the first link. For example, the switching manager 116 activates an output of the switching element 322 by switching paths from activated inputs of the switching element 322 to the output. To illustrate, the switching manager 116 configures the output of the switching element 322 to connect to (e.g., select) the activated inputs of the switching element 322. As another example, the switching manager 116 activates the input of the switching element 344 by switching paths from the input to activated outputs of the switching element 344. To illustrate, the switching manager 116 configures each of the activated outputs of the switching element 344 to connect to (e.g., select) the input of switching element 344. In a particular aspect, the switching manager 116 configures a particular output of the switching element 344 to select one or more subchannels of a particular input of the switching element 344. In a particular aspect, the switching manager 116 configures the switching element 344 to apply a transformation (e.g., a matrix operation) to one or more subchannels of a particular input of the switching element 344. For example, the transformation is applied to support calibration, beamforming, or both.

During operation, the resource manager 140 obtains the traffic demand data 158 indicating user traffic demand, as described with reference to FIGS. 1-3. For example, the traffic demand data 158 indicates that traffic is expected to flow from the input 302 to the output 394. It should be understood that the traffic demand data 158 indicating traffic flow from a single input to a single output is provided as an illustrative example. In other examples, the traffic demand data 158 also indicates that traffic is expected to flow from various inputs to various outputs. In a particular implementation, the traffic demand data 158 indicates that the traffic is expected to flow from the input 302 to the output 394, the input 302 to the output 392, the input 304 to the output 394, the input 304 to the output 396, any of the inputs 302-308 to any of the outputs 392-398, or a combination thereof.

The resource manager 140 generates first path data 345 based on the traffic demand data 158. The first path data 345 represents a configuration of the components 311 to provide one or more traffic paths 362 through the MIN 110 to accommodate the user traffic demand. For example, the resource manager 140 generates the first path data 345 to indicate a traffic path 372 from the input 302 to the output 394. To illustrate, the traffic path 372 goes from the input 302 to the switching element 322 of the stage 343, from the switching element 322 to the switching element 342 of the stage 347, and from the switching element 342 to the output 394. In a particular implementation, the first path data 345 indicates that a first link between the input 302 and the switching element 322, a second link between the switching element 322 and the switching element 342, and a third link between the switching element 342 and the output 394 are to be activated. In a particular example, the first path data 345 indicates that an output of the input 302 that is coupled to the first link, an input of the switching element 322 that is coupled to the first link, an output of the switching element 322 that is coupled to the second link, an input of the switching element 342 that is coupled to the second link, an output of the switching element 342 that is coupled to the third link, and an input of the output 394 that is coupled to the third link are to be activated.

The resource manager 140, subsequent to generating the first path data 345 to accommodate the user traffic demand indicated by the traffic demand data 158, determines whether a potential failure of the MIN 110 can be isolated, based on the traffic paths 362, to a single component of the MIN 110. For example, the resource manager 140, in response to determining that at least one of the components 311 (e.g., the inputs 302-308, the switching elements 322-324, the switching elements 342, the switching element 344, the outputs 392-398, the first plurality of links, the second plurality of links, or the third plurality of links) of the MIN 110 is not included in any of the traffic paths 362 or that at least two of the components 311 are included in identical paths, determines that a potential failure of the MIN 110 cannot be isolated, based on the traffic paths 362, to a single component of the MIN 110. To illustrate, the resource manager 140, in response to determining that the inputs 304-308, the switching element 324, the switching element 344, the output 392, the outputs 396-398, the link between the input 302 and the switching element 324, the links between each of the inputs 304-308 and each of the switching elements 322-324, the link between the switching element 322 and the switching element 344, the links between the switching element 324 and each of the switching elements 342 and the switching element 344, the link between the switching element 342 and the output 392, the links between the switching element 342 and each of the outputs 396-398, and the links between the switching element 344 and each of the outputs 392-398 are not included in any of the traffic paths 362 or that the input 302, the switching element 322, the switching element 342, and the output 394 are included in an identical set of paths (e.g., the traffic path 372), that a potential failure of the MIN 110 cannot be isolated, based on the traffic paths 362, to a single component of the MIN 110.

The resource manager 140 selectively generates second path data 346 based on a determination that a potential failure of the MIN 110 cannot be isolated, based on the traffic paths 362, to a single component of the MIN 110. The second path data 346 represents a modified configuration of the components 311 to provide paths 360 (e.g., the traffic paths 362 and one or more test paths 364) through the MIN 110 to facilitate isolation of the failure of the MIN 110 to a single component.

The resource manager 140, in response to determining that a first component of the MIN 110 is not included in at least one of the traffic paths 362 or the test paths 364, adds a first test path including the first component to the test paths 364. For example, the resource manager 140, during a first test path generation stage 382, generates a first subset of test paths 364 so that each the plurality of inputs (e.g., the inputs 302-308), the plurality of switching elements (e.g., the switching elements 322-324, the switching element 342, and the switching element 344), and the plurality of outputs (e.g., the outputs 392-398) of the MIN 110 is included in at least one of the paths 360. The resource manager 140, during a second test path generation stage 384, generates a second subset of test paths 364 so that each of the links (e.g., the first plurality of links, the second plurality of links, and the third plurality of links) of the MIN 110 that has available resources is included in at least one of the paths 360. The resource manager 140 adds a component (e.g., identifiers of the component) to an out of resources list 380 in response to determining that the component is out of resources. For example, the resource manager 140 determines that a component of the components 311 is out of resources in response to determining that the component is out of available bandwidth. To illustrate, the resource manager 140 tracks an amount of available bandwidth for one or more of the components 311. The resource manager 140 updates (e.g., reduces) the available bandwidth for a component when the component is included in a path that is added to the paths 360. As another example, the resource manager 140 determines that a switching element of the components 311 is out of resources in response to determining that the switching element cannot support further switching. In a particular aspect, the switching element is configured to support a particular number of connections between inputs and outputs of the switching element. In this aspect, the resource manager 140 tracks a number of available connections of the switching element. The resource manager 140 updates (e.g., reduces) the number of available connections for the switching element when a path is added to the paths 360 that indicates that a connection is to be added between a first component via the switching element to a second component.

In a particular example, the resource manager 140 generates the first subset of the test paths 364 during the first test path generation stage 382 based on the following pseudo-code:

WHILE a switching element, input, or output is not included in at least one of the paths, designate this switching element, input, or output as the selected upstream component
designate this switching element, input, or output as the selected downstream component
add this switching element, input, or output to a test path
WHILE selected upstream component is not an input
    find the upstream component that is included in the fewest of the paths
    add the upstream component to the test path
    designate the upstream component as the selected upstream component
END WHILE
WHILE selected downstream component is not an output
    find the downstream component that is included in the fewest of the paths
    add the downstream component to the test path
    designate the downstream component as the selected downstream component
END WHILE
END WHILE In a particular example, the resource manager 140 generates the second subset of the test paths 364 during the second test path generation stage 384 based on the following pseudocode:

included in an identical set of paths, generates a first test path including either the first component or the second component and adds the first test path to the test paths 364. The identical set of paths includes a subset of the traffic paths 362, a subset of the test paths 364, or a combination thereof. To illustrate, the resource manager 140, in response to determining that a first link between the input 302 and the switching element 322 is included in an identical set of paths as a second link between the switching element 342 and the output 394, generates a test path that includes either the first link or the second link. To illustrate, the resource manager 140 generates a test path (e.g., input 302→switching element 324→switching element 342→output 394) including the second link and not including the first link. In a particular example, the resource manager 140 generates and uses a path difference matrix 374, a node path difference sum list 376, and a node not unique list 378 to determine the third subset of the test paths 364. To illustrate, the path difference matrix 374 includes a square matrix, e.g., a R×R matrix where R corresponds to a count of the components 311.

A first row of the path difference matrix 374 corresponds to a first component of the components 311. A first column of the path difference matrix 374 corresponds to a second component of the components 311. The resource manager 140 determines a first set of paths that includes the first component and a second set of paths that includes the second

```
WHILE a link is not included in at least one of the paths,
    designate this link as the selected upstream link
    designate this link as the selected downstream component
    add this link to a test path
    WHILE selected upstream link is not coupled to an input
        find the upstream switching element of the selected upstream link
        add the upstream switching element to the test path
        set found input link to false
        WHILE found input link is false
            find the input link coupled to the upstream switching element that is
                included in the fewest paths AND is not in an "out of resources"
                component list
            IF the input link is out of resources THEN
                add the input link to the "out of resources" component list
                set found input link to false
            ELSE
                set found input link to true
                add the input link to the test path
                designate the input link as the selected upstream link
        END WHILE
    END WHILE
    WHILE selected downstream link is not coupled to an output
        find the downstream switching element of the selected downstream link
        add the downstream switching element to the test path
        set found output link to false
        WHILE found output link is false
            find the output link coupled to the downstream switching element that is
                included in the fewest paths AND is not in an "out of resources"
                component list
            IF the output link is out of resources THEN
                add the output link to the "out of resources" component list
                set found output link to false
            ELSE
                set found output link to true
                add the output link to the test path
                designate the output link as the selected downstream link
        END WHILE
    END WHILE
END WHILE
```

The resource manager 140, during a third test path generation stage 386, generates a third subset of the test paths 364 so that no two components of the components 311 are included in an identical subset of the paths 360. For example, the resource manager 140, based on determining that each of a first component and a second component is component. A first element of the path difference matrix 374 corresponding to the first row and the first column indicates a count of symmetric differences between the first set of paths and the second set of paths.

In a particular example, the resource manager 140, in response to determining that the input 302 is included in the traffic path 372 (e.g., input 302→switching element 322→switching element 342→output 394) and a first test path (e.g., input 302→switching element 324→switching element 342→output 392), determines that a first set of paths corresponding to the input 302 includes the traffic path 372 and the first test path. The resource manager 140, in response to determining that the switching element 322 is included in the traffic path 372 (e.g., input 302→switching element 322→switching element 342→output 394), a second test path (e.g., input 306→switching element 322→switching element 342→output 396), a third test path (e.g., input 304→switching element 322→switching element 344→output 394), and a fourth test path (e.g., input 308→switching element 322→switching element 344→output 396), determines that a second set of paths corresponding to the switching element 322 includes the traffic path 372, the second test path, the third test path, and the fourth test path. The resource manager 140 determines that a symmetric difference between the first set of paths and the second set of paths includes the first test path, the second test path, the third test path, and the fourth test path. An element of the path difference matrix 374 corresponding to the input 302 and the switching element 322 indicates a count (e.g., 4) of the paths included in the symmetric difference (e.g., the paths that do not include both the input 302 and the switching element 322).

In another particular example, the resource manager 140, in response to determining that a first link between the input 302 and the switching element 322 is included in the traffic path 372 (e.g., input 302→switching element 322 switching element 342→output 394), determines that a first set of paths corresponding to the first link includes the traffic path 372. The resource manager 140, in response to determining that a second link between the switching element 342 and the output 394 is included in the traffic path 372 (e.g., input 302→switching element 322→switching element 342→output 394), determines that a second set of paths corresponding to the second link includes the traffic path 372. The resource manager 140 determines that there is no symmetric difference between the first set of paths and the second set of paths. An element of the path difference matrix 374 corresponding to the first link and the second link indicates a count (e.g., 0) of the paths included in the symmetric difference.

The path difference matrix 374 is symmetric. For example, a second row of the path difference matrix corresponds to the second component of the components 311 and a second column of the path difference matrix 374 corresponds to the first component of the components 311. A second element of the path difference matrix corresponding to the second row and the second column also indicates the count of symmetric differences between the first set of paths and the second set of paths. In cases where a row of a particular element of the path difference matrix 374 and a column of the particular element both correspond to the same component, the particular element indicates that the count of symmetric differences is 0.

The resource manager 140 generates the node path difference sum list 376 by adding the count of symmetric differences for each component. In a particular example, the node path difference sum list 376 includes a first value for the input 302 by summing the row values of a first column of the path difference matrix 374 that corresponds to the input 302. In another example, the node path difference sum list 376 includes a first value for the input 302 by summing the column values of a first row of the path difference matrix 374 that corresponds to the input 302.

The node not unique list 378 indicates components that have available resources and are included in an identical set of paths as at least one other component. For example, the resource manager 140 adds a component (e.g., an identifier of the component) to the node not unique list 378 in response to determining that the out of resources list 380 does not indicate the component and that a row (or a column) of the path difference matrix 374 corresponding to the component includes more than one element having a value (e.g., 0) indicating no symmetric differences.

In a particular implementation, the resource manager 140, during the third test path generation stage 386, generates the third subset of the test paths 364 based on the following pseudocode:

```
WHILE Node Not Unique List is not empty
    find the component in the Node Not Unique List that has the smallest Node Path
        Difference
    IF the component includes a link THEN
        designate the component as the selected upstream link
        designate the component as the selected downstream link
        add the component to a test path
        WHILE the selected upstream link is not coupled to an input
            find the upstream switching element of the selected upstream link
            set found input link to false
            WHILE found input link is false
                find the input link coupled to the upstream switching element that is
                    included in first paths that have the fewest intersections with
                    second paths that include the component
                IF the input link is out of resources THEN
                    add the input link to the "out of resources" component list
                    set found input link to false
                    IF all input links coupled to the upstream switching element have
                        been tested, add the upstream switching element to the "out of
                        resources" component list
                ELSE
                    set found input link to true
                    add the input link to the test path
                    designate the input link as the selected upstream link
            END WHILE
        END WHILE
        WHILE the selected downstream link is not coupled to an output
            find the downstream switching element of the selected downstream link
            set found output link to false
```

```
                WHILE found output link is false
                    find the output link coupled to the downstream switching element that
                        is included in first paths that have the fewest intersections with
                        second paths that include the component
                    IF the output link is out of resources THEN
                        add the output link to the "out of resources" component list
                        set found output link to false
                        IF all output links coupled to the downstream switching element
                            have been tested, add the downstream switching element to the
                            "out of resources" component list
                    ELSE
                        set found output link to true
                        add the output link to the test path
                        designate the output link as the selected downstream link
                END WHILE
            END WHILE
        ELSE IF the component does not include a link THEN
            find an input link of the component that is included in the fewest paths
            designate the input link as the selected upstream link
            find an output link of the component that is included in the fewest paths
            designate the output link as the selected downstream link
            add the component to the test path
            WHILE the selected upstream link is not coupled to an input
                find the upstream switching element of the selected upstream link
                set found input link to false
                WHILE found input link is false
                    find the input link coupled to the upstream switching element that is
                        included in first paths that have the fewest intersections with
                        second paths that include the component
                    IF the input link is out of resources THEN
                        add the input link to the "out of resources" component list
                        set found input link to false
                        IF all input links coupled to the upstream switching element have
                            been tested, add the upstream switching element to the "out of
                            resources" component list
                    ELSE
                        set found input link to true
                        add the input link to the test path
                        designate the input link as the selected upstream link
                END WHILE
            END WHILE
            WHILE the selected downstream link is not coupled to an output
                find the downstream switching element of the selected downstream link
                set found output link to false
                WHILE found output link is false
                    find the output link coupled to the downstream switching element that
                        is included in first paths that have the fewest intersections with
                        second paths that include the component
                    IF the output link is out of resources THEN
                        add the output link to the "out of resources" component list
                        set found output link to false
                        IF all output links coupled to the downstream switching element
                            have been tested, add the downstream switching element to the
                            "out of resources" component list
                    ELSE
                        set found output link to true
                        add the output link to the test path
                        designate the output link as the selected downstream link
                END WHILE
            END WHILE
        Update Path Difference Matrix, Node Path Difference Sum List, and Node Not
            Unique List
END WHILE
```

The second path data 346 facilitates isolation of a failure of the MIN 110 to a single component of the components 311, as further described with reference to FIG. 4. The resource manager 140 generates the switching configuration data 142 based on the second path data 346. For example, the switching configuration data 142 indicates links of the MIN 110 to be activated or deactivated corresponding to the paths 360. To illustrate, the resource manager 140, in response to determining that the paths 360 include the traffic path 372 (e.g., input 302→switching element 322→switching element 342→output 394) generates the switching configuration data 142 to indicate that a first link between the input 302 and the switching element 322, a second link between the switching element 322 and the switching element 342, and a third link between the switching element 342 and the output 394 are to be activated.

In a particular implementation, the switching configuration data 142 includes a bit matrix where each element represents a particular link of the MIN 110. The resource manager 140 initializes each element of the bit matrix to a first value (e.g., 0) to indicate that the corresponding link is to be deactivated. The resource manager 140, in response to determining that a particular link (e.g., the first link, the second link, or the third link) is included in at least one of the paths 360, updates a corresponding element of the bit matrix to a second value (e.g., 1) to indicate that the particular link is to be activated. It should be understood that the switching configuration data 142 including a bit matrix is provided as an illustrative example. In other examples, the switching configuration data 142 includes a bit array, a bitmap, a list, an array, a matrix, or another data structure.

In a particular illustrative example, the resource manager 140, in response to determining that the paths 360 include a first test path (e.g., input 304→switching element 324→switching element 344→output 392) generates (or updates) the switching configuration data 142 to indicate that a first link between the input 304 and the switching element 324, a second link between the switching element 324 and the switching element 344, and a third link between the switching element 344 and the output 392 are to be activated.

The resource manager 140 sends the switching configuration data 142 to the switching manager 116 to initiate configuration of the MIN 110. For example, the switching manager 116 activates or deactivates links of the MIN 110 based on the switching configuration data 142. To illustrate, the switching manager 116, in response to determining that the switching configuration data 142 indicates that a first link between the input 302 and the switching element 322, a second link between the switching element 322 and the switching element 342, and a third link between the switching element 342 and the output 394 are to be activated, activates the first link, the second link, and the third link to form a path by connecting the input 302 to the switching element 322, the switching element 322 to the switching element 342, and the switching element 342 to the output 394. In a particular aspect, the switching manager 116 activates the first link by activating an output of the input 302 that is coupled to the first link and activating an input of the switching element 322 that is coupled to the first link. In a particular aspect, the switching manager 116 activates the second link by activating an output of the switching element 322 that is coupled to the second link and activating an input of the switching element 342 that is coupled to the second link. In a particular implementation, the switching manager 116 activates the third link by activating an output of the switching element 342 that is coupled to the third link and activating an input of the output 394 that is coupled to the third link.

The resource manager 140 thus enables configuration of the MIN 110 that facilitates isolation of a failure of the MIN 110 to a single component of the MIN 110. For example, the resource manager 140 generates the second path data 346 indicating the paths 360 that facilitate isolation of a failure of the MIN 110 to a single component of the components 311. The resource manager 140 generates the switching configuration data 142 based on the second path data 346 and provides the switching configuration data 142 to the switching manager 116 to initiate configuration of the MIN 110.

Figure 4:
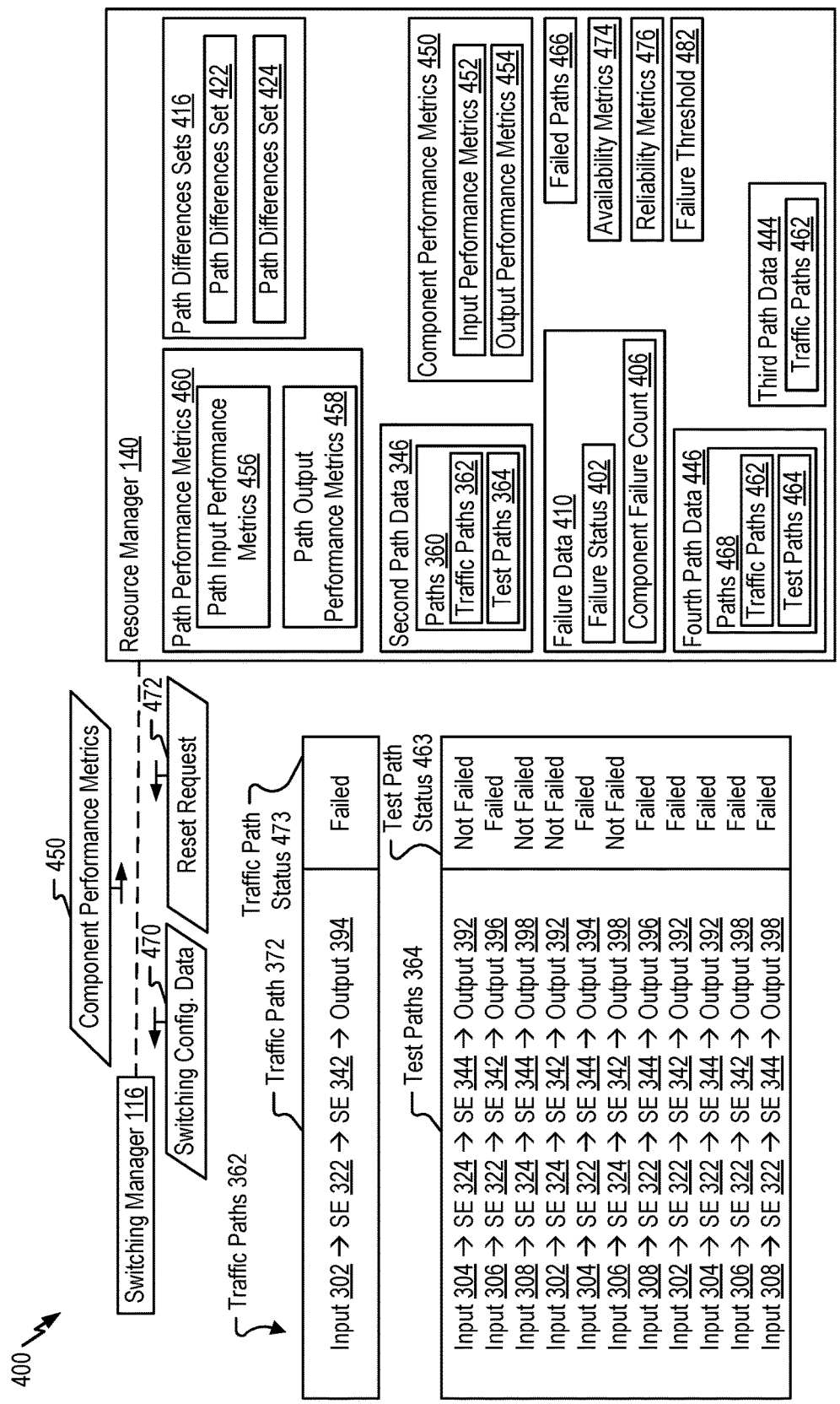
FIG. 4 is a diagram that illustrates an example of failure detection in a configured multistage interconnection network.

FIG. 4 depicts an illustrative example 400 of failure detection in a configured multistage interconnection network. For example, the MIN 110 is configured based on the switching configuration data 142, as described with reference to FIGS. 1-3.

The switching manager 116, subsequent to configuring the MIN 110 based on the switching configuration data 142, generates component performance metrics 450. In a particular aspect, the switching manager 116 generates the component performance metrics 450 in response to detecting an expiration of a timer, receiving a request for the component performance metrics 450, or both.

The component performance metrics 450 include input performance metrics 452 corresponding to a plurality of inputs of the MIN 110 and output performance metrics 454 corresponding to a plurality of outputs of the MIN 110. For example, the input performance metrics 452 include a first input performance metric, a second input performance metric, a third input performance metric, and a fourth input performance metric corresponding to the input 302, the input 304, the input 306, the input 308, respectively, of FIG. 3. To illustrate, the first input performance metric includes at least one of a power measurement, a signal to noise ratio, a carrier to noise ratio, a received signal strength, a bit error rate, a symbol error rate, or an autocorrelation magnitude of the input 302.

In a particular example, the output performance metrics 454 include a first output performance metric, a second output performance metric, a third output performance metric, and a fourth output performance metric corresponding to the output 392, the output 394, the output 396, the output 398, respectively, of FIG. 3. To illustrate, the first output performance metric includes at least one of a power measurement, a signal to noise ratio, a carrier to noise ratio, a received signal strength, a bit error rate, a symbol error rate, or an autocorrelation magnitude of the output 392.

The resource manager 140 receives performance metrics of the components 311 from the switching manager 116. For example, the resource manager 140 receives the input performance metrics 452, the output performance metrics 454, or a combination thereof, from the switching manager 116. The resource manager 140 determines, based on the component performance metrics 450, path performance metrics 460 corresponding to the paths 360. The path performance metrics 460 include path input performance metrics 456 and path output performance metrics 458 of the paths 360. For example, the resource manager 140 determines a first path input performance metric and a first path output performance metric of the traffic path 372 of the paths 360. To illustrate, the resource manager 140 determines that the output 394 of the traffic path 372 is included in the traffic path 372 (e.g., input 302→switching element 322→switching element 342→output 394) and a first test path (e.g., input 304→switching element 322→switching element 344→output 394). The resource manager 140 determines that traffic path 372 and the first test include the input 302 and the input 304. The resource manager 140 determines a first path input performance metric of the traffic path 372 based on a first input performance metric of the input 302 and a second input performance metric of the input 304. The resource manager 140 determines a first path output performance metric of the traffic path 372 based on a first output performance metric of the output 394. The component performance metrics 450 indicate the first input performance metric of the input 302, the second input performance metric of the input 304, and the first output performance metric of the output 394.

In a particular implementation, the first path input performance metric is based on (e.g., corresponds to) a sum of the first input performance metric and the second input performance metric, a difference between the first input performance metric and the second input performance metric, an average of the first input performance metric and the second input performance metric, or a combination thereof. In a particular implementation the first path output performance metric corresponds to the first output performance metric of the output 394. The path input performance metrics 456 include the first path input performance metric of the traffic path 372. The path output performance metrics 458 include the first path output performance metric of the traffic path 372.

The resource manager 140 determines whether the path input performance metrics 456 and the path output performance metrics 458 indicate that a first set of paths failed. For example, the resource manager 140 identifies one or more failed paths 466 of the paths 360, if any, based on a comparison of the path input performance metrics 456 and the path output performance metrics 458. The resource manager 140 determines traffic path status 473 of the traffic paths 362 and test path status 463 of the test paths 364. For example, the resource manager 140 determines that the traffic path 372 failed in response to determining that the first path input performance metric does not match the first path output performance metric. To illustrate, the resource manager 140 determines that the first path input performance metric does not match the first path output performance metric in response to determining that a difference between the first path input performance metric and the first path output performance is greater than a tolerance threshold. The resource manager 140 adds the traffic path 372 (or an identifier of the traffic path 372) to the failed paths 466.

The resource manager 140, in response to determining that the failed paths 466 includes at least one path, determines path differences sets 416 of the components 311. A particular path is included in a particular path differences set of a particular component in response to determining that the particular path does not include the particular component and determining that the particular path failed. For example, the resource manager 140 determines a path differences set 422 corresponding to the input 302. The path differences set 422 indicates one or more paths that failed and that do not include the input 302. For example, the path differences set 422 indicates a first test path (e.g., input 306→switching element 322→switching element 342→output 396), a second test path (e.g., input 304→switching element 322→switching element 344→output 394), a third test path (e.g., input 308→switching element 322→switching element 344→output 396), a fourth test path (e.g., input 304→switching element 322→switching element 344→output 392), a fifth test path (e.g., input 306→switching element 322→switching element 342→output 398), and a sixth test path (e.g., input 308→switching element 322→switching element 344→output 398).

As another example, the resource manager 140 determines a path differences set 424 corresponding to the switching element 322. The path differences set 424 indicates any failed paths that do not include the switching element 322. For example, the path differences set 424 is empty because each of the failed paths 466 includes the switching element 322. The resource manager 140 selects the path differences set 424 in response to determining that the path differences set 424 includes the fewest paths (e.g., no paths) among the path differences sets 416. The path differences set 424 that includes the fewest paths corresponds to a component that is included in most of the failed paths 466. For example, the resource manager 140 designates the switching element 322 as a faulty component in response to determining that the path differences set 424 includes the fewest paths among the path differences sets 416. The resource manager 140 thus isolates the failure of the MIN 110 to the switching element 322.

The resource manager 140 maintains failure data 410 for the MIN 110. For example, the resource manager 140, in response to designating the switching element 322 as a faulty component, updates (e.g., increments by 1) a component failure count 406 of the switching element 322. The component failure count 406 indicates a number of times the switching element 322 has been detected as a faulty component during a first time period. For example, the first time period is between a most recent configuration time of the MIN 110 and a next configuration time of the MIN 110. As another example, the first time period is between an installation time of the switching element 322 and a replacement time of the switching element 322.

The resource manager 140 determines a fault detection time (e.g., 1 PM on Jan. 23, 2019) in response to designating the switching element 322 as a faulty component. For example, the fault detection time corresponds to a time at which the component performance metrics 450 were generated by the switching manager 116, a time at which the component performance metrics 450 were received by the resource manager 140, or both.

In a particular aspect, the resource manager 140, in response to determining that the switching element 322 is included in at least one of the traffic paths 362, generates (or updates) a failure status 402 of the switching element 322 to indicate that the fault at the switching element 322 detected at the fault detection time is affecting service. Alternatively, the resource manager 140, in response to determining that the switching element 322 is not included in any of the traffic paths 362, generates (or updates) the failure status 402 to indicate that the fault at the switching element 322 detected at the fault detection time is not affecting service.

The resource manager 140, in response to determining that the component failure count 406 is less than or equal to a failure threshold 482, sends a reset request 472 to the switching manager 116 at a reset request time (e.g., 1:06 PM on Jan. 23, 2019). The reset request 472 indicates that a particular component (e.g., the switching element 322) is to be reset. In a particular aspect, a particular failure status of the particular component indicates that the particular component was detected faulty at a particular time. For example, the resource manager 140 generates (or updates) the failure status 402 to indicate that the switching element 322 is detected as faulty at the fault detection time. The resource manager 140 updates the failure data 410 to indicate that the MIN 110 was at least partially unavailable between the fault detection time (e.g., 1 PM on Jan. 23, 2019) and the reset request time (e.g., 1:06 PM on Jan. 23, 2019). In a particular aspect, the resource manager 140, in response to determining that the switching element 322 is included in at least one of the traffic paths 362, updates the failure data 410 to indicate that the MIN 110 was at least partially unavailable between the fault detection time and the reset request time. The switching manager 116 resets the switching element 322 in response to receiving the reset request 472.

In a particular aspect, the resource manager 140, in response to determining that the component failure count 406 is greater than the failure threshold 482, determines that the switching element 322 has failed and designates the switching element 322 as a failed component. For example, the resource manager 140 generates (or updates) the failure status 402 to indicate that the switching element 322 has failed at the fault detection time (e.g., 1 PM on Jan. 23, 2019).

The resource manager 140, in response to determining that the switching element 322 has failed, generates third path data 444 indicating one or more traffic paths 462 (e.g., updated traffic paths) to route around the switching element 322 and accommodate the user traffic demand indicated by the traffic demand data 158 of FIG. 1. The traffic paths 462 correspond to an update to the traffic paths 362. For example, the resource manager 140 generates the third path data 444 by performing operations similar to operations performed in generating the first path data 345, as described with reference to FIG. 3. A difference between generating the first path data 345 and the third path data 444 includes disregarding the failed component (e.g., the switching element 322). For example, the traffic paths 462 exclude the failed component (e.g., the switching element 322). When the failed component includes a switching element, an input, or an output, the resource manager 140 also disregards the links between the failed component and each of the other components that are coupled to the failed component in generating the third path data 444. For example, when the failed component includes the switching element 322, the traffic paths 462 exclude the links between the switching element 322 and each of the other components (e.g., the input 302, the input 304, the input 306, the input 308, the switching element 342, and the switching element 344) that are coupled to the switching element 322.

In a particular aspect, the resource manager 140 generates the third path data 444 indicating the traffic paths 462 as an update to the traffic paths 362 in response to determining that the switching element 322 has failed and that at least one of the traffic paths 362 includes the switching element 322. Alternatively, the resource manager 140 generates the third path data 444 indicating the traffic paths 462 that are the same as the traffic paths 362 in response to determining that the switching element 322 has failed and that none of the traffic paths 362 include the switching element 322.

The resource manager 140 selectively generates fourth path data 446 based on a determination that a potential failure of the MIN 110 cannot be isolated, based on the traffic paths 462, to a single component of the components 311. The fourth path data 446 indicates one or more paths 468 that enable isolation of a potential failure of the MIN 110 to a single component of the components 311. The paths 468 include the traffic paths 462 and one or more test paths 464. The test paths 464 correspond to an update to the test paths 364. In a particular example, the resource manager 140 performs operations similar to operations performed in generating the second path data 346, as described with reference to FIG. 3. A difference between generating the second path data 346 and the fourth path data 446 includes disregarding the failed component (e.g., the switching element 322). For example, the test paths 464 exclude the failed component (e.g., the switching element 322). When the failed component includes a switching element, an input, or an output, the resource manager 140 also disregards the links between the failed component and each of the other components that are coupled to the failed component in generating the fourth path data 446. For example, when the failed component includes the switching element 322, the test paths 464 exclude the links between the switching element 322 and each of the other components (e.g., the input 302, the input 304, the input 306, the input 308, the switching element 342, and the switching element 344) that are coupled to the switching element 322.

The resource manager 140 generates switching configuration data 470 (e.g., updated configuration data) based on the fourth path data 446. The switching configuration data 470 indicates an updated configuration of the MIN 110 that routes around the failed component (e.g., the switching element 322) and enables isolation of a potential failure of the MIN 110 to a single component of the components 311. For example, the switching configuration data 470 indicates links (or, inputs and outputs of components) of the MIN 110 that are to be activated or deactivated corresponding to the paths 468. The resource manager 140 sends, at a reconfiguration request time (e.g., 1:06 PM on Jan. 23, 2019), the switching configuration data 470 to the switching manager 116 to initiate reconfiguration of the MIN 110. In a particular implementation, the resource manager 140 updates the failure data 410 to indicate that reconfiguration of the MIN 110 to route around the failed component (e.g., the switching element 322) was initiated at the reconfiguration request time (e.g., 1:06 PM on Jan. 23, 2019).

The resource manager 140 updates the failure data 410 to indicate that the MIN 110 was at least partially unavailable between the fault detection time (e.g., 1 PM on Jan. 23, 2019) and the reconfiguration request time (e.g., 1:06 PM on Jan. 23, 2019). In a particular aspect, the resource manager 140, in response to determining that the switching element 322 is included in at least one of the traffic paths 362, updates the failure data 410 to indicate that the MIN 110 was at least partially unavailable between the fault detection time and the reconfiguration request time.

In a particular implementation, the resource manager 140 generates availability metrics 474 and reliability metrics 476 of the MIN 110 based on failure statuses of the components 311. For example, the resource manager 140 generates the availability metrics 474, the reliability metrics 476, or a combination thereof, in response to receiving a request, detecting a faulty component, or both. The availability metrics 474 indicate a percentage of time that the MIN 110 was available during various time periods. For example, the resource manager 140 determines that the failure data 410 indicates that the MIN 110 was unavailable during a first time period (e.g., between 1 PM and 1:06 PM on Jan. 23, 2019). In a particular example, the first time period is between the fault detection time and the reset request time. In another example, the first time period is between the fault detection time and the reconfiguration request time. The resource manager 140 determines a first availability metric corresponding to a second time period (e.g., between 1 PM and 2 PM on Jan. 23, 2019) based on the first time period and the second time period (e.g., 1—first time period/second time period). The first availability metric indicates a percentage of time (e.g., 0.9 or 90%) that the MIN 110 was available during the second time period (e.g., between 1 PM and 2 PM on Jan. 23, 2019). In some aspects, the failure data 410 indicates that the MIN 110 is at least partially unavailable during multiple time periods within the second time period. The resource manager 140 determines the first availability metric based on the multiple time periods and the second time period.

In a particular implementation, the availability metrics 474 include component-specific availability metrics. For example, the availability metrics 474 include a particular availability metric corresponding to a particular component of the components 311. For example, the particular availability metric indicates a percentage of time that the particular component was available during various time periods. For example, the resource manager 140 determines that the failure data 410 indicates that the particular component was detected as faulty and was unavailable during a first time period (e.g., between 1 PM and 1:06 PM on Jan. 23, 2019). In a particular example, the first time period is between the fault detection time and the reset request time. In another example, the first time period is between the fault detection time and the reconfiguration request time. The resource manager 140 determines a first availability metric corresponding to a second time period (e.g., between 1 PM and 2 PM on Jan. 23, 2019) based on the first time period and the second time period (e.g., 1—first time period/second time period). The first availability metric indicates a percentage of time (e.g., 0.9 or 90%) that the particular component was available during the second time period (e.g., between 1 PM and 2 PM on Jan. 23, 2019). In some aspects, the failure data 410 indicates that the particular component was unavailable during multiple time periods within the second time period. The resource manager 140 determines the first availability metric based on the multiple time periods and the second time period.

In a particular aspect, the resource manager 140, in response to determining that the particular component was available less than an availability threshold, designates the particular component as a failed component. For example, the resource manager 140, in response to determining that the first availability metric of the particular component fails to satisfy (e.g., is less than) an availability threshold, designates the particular component as a failed component. The resource manager 140 generates updated path data to route around the failed component, as described herein.

The reliability metrics 476 indicate an average period (e.g., a mean period, a median period, or a mode period) between detecting faulty components over various time periods. For example, the resource manager 140 determines that the failure status 402 of the switching element 322 indicates that a first fault of the switching element 322 was detected at the first fault detection time (e.g., 1:00 PM on Jan. 23, 2019), that a second failure status of a second component of the components 311 indicates a second fault detection time (e.g., 1:05 PM on Jan. 23, 2019) of the second component, and that a third failure status of a third component of the components 311 indicates that a third fault detection time (e.g., 1:05 PM on Jan. 24, 2019) of the third component. The resource manager 140 sorts the fault detection times and determines time differences between consecutive sorted fault detection times. For example, the second fault detection time is subsequent to the first fault detection time, and the third fault detection time is subsequent to the second fault detection time. The resource manager 140 determines a first time difference based on a difference (e.g., 5 minutes) between the first fault detection time and the second fault detection time and a second time difference based on a difference (e.g., 24 hours) between the second fault detection time and the third fault detection time. The resource manager 140 determines a first reliability metric (e.g., an average value) corresponding to a first time period (e.g., between 1 PM on Jan. 23, 2019 and 1 PM on Jan. 25, 2019) based on the first time difference and the second time difference (e.g., 12 hours, 2 minutes, and 30 seconds).

In a particular implementation, the reliability metrics 476 include component-specific reliability metrics. For example, the reliability metrics 476 include a particular reliability metric corresponding to a particular component of the components 311. For example, the particular reliability metric indicates an average period (e.g., a mean period, a median period, or a mode period) between detecting the particular component as faulty over various time periods. For example, the resource manager 140 determines that the failure status 402 of the switching element 322 indicates that a first fault of the switching element 322 was detected at a first fault detection time (e.g., 1:00 PM on Jan. 23, 2019), that a second fault of the switching element 322 was detected at a second fault detection time (e.g., 1:05 PM on Jan. 23, 2019), and that a third fault of the switching element 322 was detected at a third fault detection time (e.g., 1:05 PM on Jan. 24, 2019). The resource manager 140 sorts the fault detection times and determines time differences between consecutive sorted fault detection times. For example, the second fault detection time is subsequent to the first fault detection time, and the third fault detection time is subsequent to the second fault detection time. The resource manager 140 determines a first time difference based on a difference (e.g., 5 minutes) between the first fault detection time and the second fault detection time and a second time difference based on a difference (e.g., 24 hours) between the second fault detection time and the third fault detection time. The resource manager 140 determines a first reliability metric (e.g., an average value) of the switching element 322 corresponding to a first time period (e.g., between 1 PM on Jan. 23, 2019 and 1 PM on Jan. 25, 2019) based on the first time difference and the second time difference (e.g., 12 hours, 2 minutes, and 30 seconds).

In a particular aspect, the resource manager 140, in response to determining that the particular component was reliable less than a reliability threshold, designates the particular component as a failed component. For example, the resource manager 140, in response to determining that a first reliability metric of the particular component fails to satisfy (e.g., is less than) a reliability threshold, designates the particular component as a failed component. The resource manager 140 generates updated path data to route around the failed component, as described herein.

In a particular aspect, the resource manager 140 generates a user-specific availability metric, a user-specific reliability metric, or both. For example, the resource manager 140 identifies components included in at least one of the traffic paths 362 associated with a particular user (e.g., a particular customer, a particular network operator, or both). The resource manager 140 generates a user availability metric of the particular user based on availability metrics associated with the identified components, a user reliability metric of the particular user based on reliability metrics associated with the identified components, or both.

In some implementations, the resource manager 140 determines predicted performance of the MIN 110 based on the availability metrics 474. For example, the resource manager 140 determines that a first availability metric of the availability metrics 474 indicates that the MIN 110 was available a first percentage of time (e.g., 90%) during a first time period (e.g., during January) and that a second availability metric of the availability metrics 474 indicates that the MIN 110 was available a second percentage of time (e.g., 80%) during a second time period (e.g., during February). In a particular implementation, the resource manager 140 determines an availability trend (e.g., availability decreases by 10% every month) based on the first availability metric and the second availability metric. The resource manager 140 generates a prediction based on the availability trend and enables pre-allocation of resources based on the prediction. For example, the resource manager 140 determines, based on the availability trend, that the MIN 110 is predicted to be available less than a threshold percentage (e.g., 60%) of a third time period (e.g., April). The resource manager 140 may generate a request for replacement components to be available by the third time period.

In some implementations, the resource manager 140 determines predicted performance of a particular component of the components 311 based on the availability metrics 474. For example, the resource manager 140 determines that a first availability metric of the availability metrics 474 indicates that the particular component was available a first percentage of time (e.g., 90%) during a first time period (e.g., on Feb. 5, 2019) and that a second availability metric of the availability metrics 474 indicates that the particular component was available a second percentage of time (e.g., 80%) during a second time period (e.g., on Feb. 6, 2019). In a particular implementation, the resource manager 140 determines an availability trend (e.g., availability decreases by 10% every day) based on the first availability metric and the second availability metric. The resource manager 140 generates a prediction based on the availability trend and enables pre-allocation of resources based on the prediction. For example, the resource manager 140 determines, based on the availability trend, that the particular component is predicted to be available less than a threshold percentage (e.g., 60%) of a third time period (e.g., on Feb. 8, 2019). The resource manager 140 may generate a request for replacement components to be available by the third time period.

In some implementations, the resource manager 140 determines predicted performance of the MIN 110 based on the reliability metrics 476. For example, the resource manager 140 determines that a first reliability metric of the reliability metrics 476 indicates a first average time (e.g., 5 hours) between detecting faulty components during a first time period (e.g., during January) and that a second reliability metric of the reliability metrics 476 indicates a second average time (e.g., 4 hours) between detecting faulty components during a second time period (e.g., during February). In a particular implementation, the resource manager 140 determines a reliability trend (e.g., reliability decreases by 20% every month) based on the first reliability metric and the second reliability metric. The resource manager 140 generates a prediction based on the reliability trend and enables pre-allocation of resources based on the prediction. For example, the resource manager 140 determines, based on the reliability trend, that an average time (e.g., 2 hours) between detecting faulty components of the MIN 110 is predicted to be less than a threshold during a third time period (e.g., April). The resource manager 140 may generate a request for replacement components to be available by the third time period.

In some implementations, the resource manager 140 determines predicted performance of a particular component of the components 311 based on the reliability metrics 476. For example, the resource manager 140 determines that a first reliability metric of the reliability metrics 476 indicates a first average time (e.g., 5 hours) between detecting the particular component as faulty during a first time period (e.g., Week 1) and that a second reliability metric of the reliability metrics 476 indicates a second average time (e.g., 4 hours) between detecting the particular component as faulty during a second time period (e.g., Week 2). In a particular implementation, the resource manager 140 determines a reliability trend (e.g., reliability decreases by 20% every week) based on the first reliability metric and the second reliability metric. The resource manager 140 generates a prediction based on the reliability trend and enables pre-allocation of resources based on the prediction. For example, the resource manager 140 determines, based on the reliability trend, that an average time (e.g., 2 hours) between detecting the particular component as faulty is predicted to be less than a threshold during a third time period (e.g., Week 4). The resource manager 140 may generate a request for replacement components to be available by the third time period.

By generating the switching configuration data 142 such that each of the components 311 is included in at least one of the paths 360 and no two of the components 311 are included in an identical set of paths, the resource manager 140 is able to isolate a failure of the MIN 110 to a single component by identifying the component that is included in most of the failed paths 466. Because the switching manager 116 passively generates the component performance metrics 450, the faulty component (e.g., the switching element 322) can be identified without adversely affecting the availability of the bandwidth of the MIN 110 for user traffic.

Figure 5:
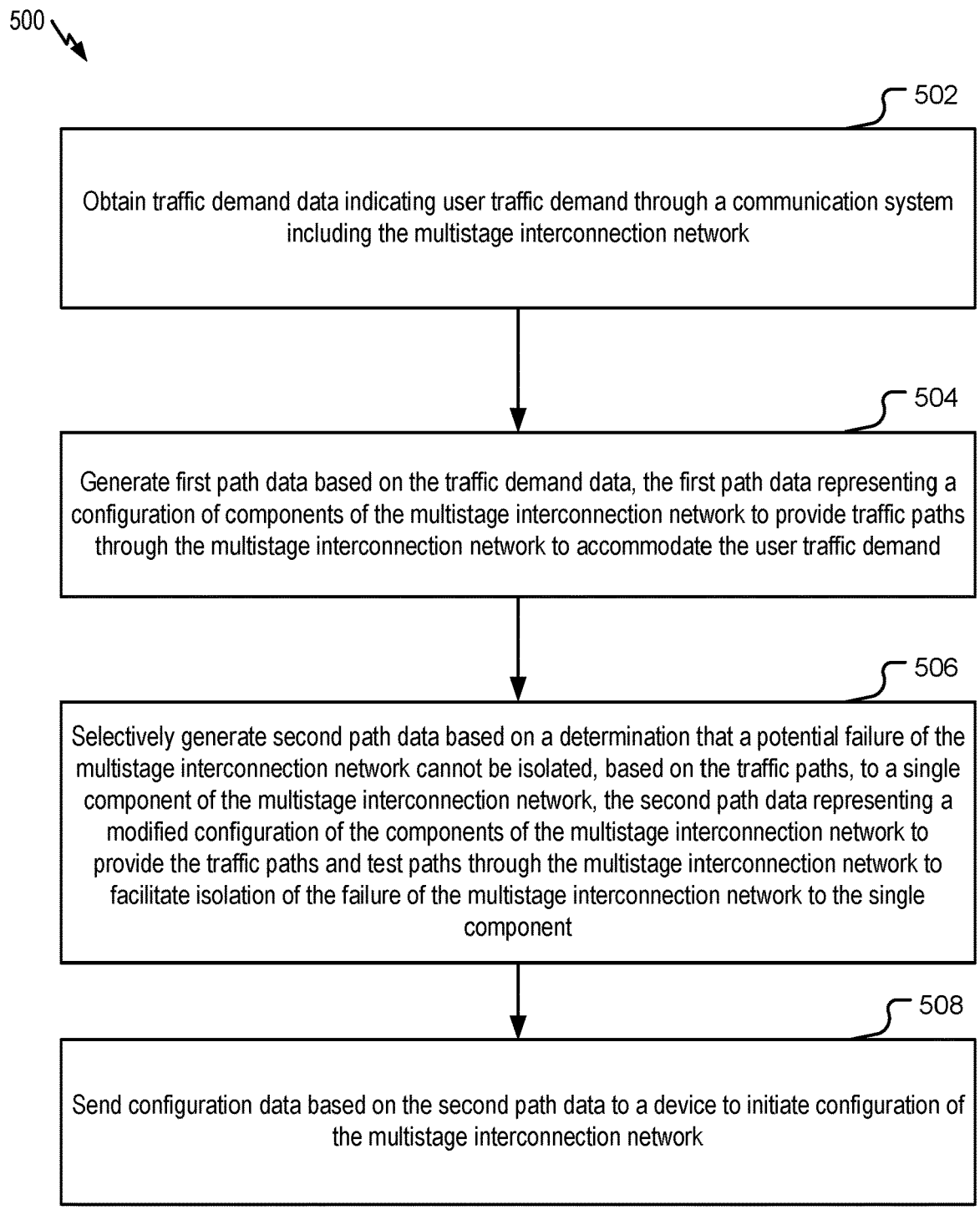
FIG. 5 is a flow chart of an example of a method of configuring a multistage interconnection network based on user traffic demand.

FIG. 5 illustrates a method 500 of configuring a multistage interconnection network based on user traffic demand. In a particular implementation, the method 500 is performed by the resource manager 140 of FIGS. 1-4, as a non-limiting example.

The method 500 includes obtaining traffic demand data indicating user traffic demand through a communication system including the multistage interconnection network, at 502. For example, the resource manager 140 of FIG. 1 obtains the traffic demand data 158 that indicates user traffic demand through a communication system including the MIN 110, as described with reference to FIGS. 1-2.

The method 500 also includes generating first path data based on the traffic demand data, at 504. For example, the resource manager 140 of FIG. 1 generates the first path data 345 based on the traffic demand data 158, as described with reference to FIG. 3. The first path data 345 represents a configuration of the components 311 to provide the traffic paths 362 through the MIN 110 to accommodate the user traffic demand.

The method 500 further includes selectively generating second path data based on a determination that a potential failure of the multistage interconnection network cannot be isolated, based on the traffic paths, to a single component of the multistage interconnection network, at 506. For example, the resource manager 140 of FIG. 1 selectively generates the second path data 346 based on a determination that a potential failure of the MIN 110 cannot be isolated, based on the traffic paths 362, to a single component of the components 311, as described with reference to FIG. 3. The second path data 346 represents a modified configuration of the components 311 to provide the traffic paths 362 and the test paths 364 through the MIN 110 to facilitate isolation of the failure of the MIN 110 to the single component.

The method 500 also includes sending configuration data based on the second path data to a device to initiate configuration of the multistage interconnection network, at 508. For example, the resource manager 140 of FIG. 1 sends the switching configuration data 142 to the switching manager 116 to initiate configuration of the MIN 110. The switching configuration data 142 is based on the second path data 346.

The method 500 enables isolation of a fault of the MIN 110 to a single component by passively (e.g., without sending test packets) monitoring the performance metrics of the multistage interconnection network. The passive monitoring of the performance metrics does not adversely impact (e.g., reduce) the bandwidth of the multistage interconnection network available for user traffic.

Although one or more of FIGS. 1-5 may illustrate systems, apparatuses, and/or methods according to the teachings of the disclosure, the disclosure is not limited to these illustrated systems, apparatuses, and/or methods. One or more functions or components of any of FIGS. 1-5 as illustrated or described herein may be combined with one or more other portions of another of FIGS. 1-5. For example, one or more elements of the method 500 of FIG. 5 may be performed in combination with other operations described herein. Accordingly, no single implementation described herein should be construed as limiting and implementations of the disclosure may be suitably combined without departing form the teachings of the disclosure. As an example, one or more operations described with reference to FIG. 5 may be optional, may be performed at least partially concurrently, and/or may be performed in a different order than shown or described.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method of configuring a multistage interconnection network, the method comprising:
   obtaining, at a first device, traffic demand data indicating user traffic demand of packets through a communication system including the multistage interconnection network;
   generating, at the first device, first path data based on the traffic demand data, the first path data representing a configuration of components of the multistage interconnection network to provide traffic paths through the multistage interconnection network to accommodate the user traffic demand;
   selectively generating, at the first device, second path data based on a determination that a potential failure of the multistage interconnection network cannot be isolated, based on the traffic paths, to a single component of the multistage interconnection network, the second path data representing a modified configuration of the components of the multistage interconnection network to provide the traffic paths and test paths through the multistage interconnection network to facilitate identification of the single component without use of test signals; and
   sending, from the first device to a second device, configuration data based on the second path data to initiate configuration of the multistage interconnection network.

2. The method of claim 1, wherein the components include one or more inputs, one or more switching elements, one or more links, and one or more outputs.

3. The method of claim 1, wherein generating the first path data includes, in response to determining that the user traffic demand indicates a first input and a first output, adding a first traffic path to the traffic paths, the first traffic path including the first input, one or more switching elements, a plurality of links, and the first output.

4. The method of claim 1, further comprising, in response to determining that a first component of the components is not included in at least one of the traffic paths, determining that the potential failure of the multistage interconnection network cannot be isolated, based on the traffic paths, to a single component of the multistage interconnection network.

5. The method of claim 1, further comprising, based on determining that each of a first component and a second component is included in an identical set of traffic paths, determining that the potential failure of the multistage interconnection network cannot be isolated, based on the traffic paths, to a single component of the multistage interconnection network.

6. The method of claim 1, wherein generating the second path data includes, in response to determining that a first component of the multistage interconnection network is not included in at least one of the traffic paths or the test paths, adding a first test path to the test paths, the first test path including the first component.

7. The method of claim 1, wherein generating the second path data includes, based on determining that each of a first component and a second component is included in an identical set of paths, adding a first test path to the test paths, the first test path including either the first component or the second component, wherein the identical set of paths includes a subset of the traffic paths, a subset of the test paths, or a combination thereof.

8. The method of claim 1, further comprising:
   receiving performance metrics of the components from the second device;
   determining that the performance metrics indicate that a first set of paths failed, the first set of paths including a first subset of the traffic paths, a first subset of the test paths, or a combination thereof;
   identifying path differences sets of the components, a particular path included in a particular path differences set of a particular component in response to determining that the particular path does not include the particular component and determining, based on the performance metrics, that the particular path failed; and
   designating a first component as faulty in response to determining that a first path differences set of the first component includes the fewest paths among the path differences sets.

9. The method of claim 1, further comprising:
   receiving performance metrics of the components from the second device; and
   updating a component failure count of a first component in response to designating, based on the performance metrics, the first component as faulty.

10. The method of claim 9, further comprising, in response to determining that the component failure count is less than or equal to a failure threshold, sending a request to the second device to reset the first component.

11. The method of claim 9, further comprising, in response to determining that the first component is included in at least one of the traffic paths, updating a failure status of the first component indicating that a fault at the first component is affecting service.

12. The method of claim 9, further comprising, in response to determining that the component failure count is greater than a failure threshold:
designating the first component as a failed component;
generating third path data indicating an update to the traffic paths to route around the first component and accommodate the user traffic demand;
selectively generating fourth path data based on the updated traffic paths; and
sending, from the first device to the second device, updated configuration data based on the fourth path data to initiate reconfiguration of the multistage interconnection network.

13. The method of claim 1, further comprising:
receiving performance metrics of the components from the second device, the performance metrics indicating an input performance metric of a first path and an output performance metric of the first path; and
detecting that the first path failed in response to determining that the input performance metric does not match the output performance metric.

14. The method of claim 13, wherein the input performance metric is based on at least one of a power measurement, a signal to noise ratio, a carrier to noise ratio, a received signal strength, a bit error rate, a symbol error rate, or an autocorrelation magnitude of an input of the first path.

15. The method of claim 13, wherein the output performance metric is based on at least one of a power measurement, a signal to noise ratio, a carrier to noise ratio, a received signal strength, a bit error rate, a symbol error rate, or an autocorrelation magnitude of an output of the first path.

16. The method of claim 13, further comprising:
determining that a first output is included in a plurality of paths having a plurality of inputs, the plurality of paths including the first path;
determining the input performance metric of the first path based at least in part on input performance metrics of the plurality of inputs, wherein the performance metrics indicate the input performance metrics of the plurality of inputs; and
determining the output performance metric of the first path based at least in part on an output performance metric of the first output, wherein the performance metrics indicate the output performance metric of the first output.

17. A computer-readable storage device storing instructions that, when executed by a processor, cause the processor to perform operations comprising:
obtaining, at a first device, traffic demand data indicating user traffic demand through a communication system including a multistage interconnection network;
generating, at the first device, first path data based on the traffic demand data, the first path data representing a configuration of components of the multistage interconnection network to provide traffic paths through the multistage interconnection network to accommodate the user traffic demand;
selectively generating, at the first device, second path data based on a determination that a potential failure of the multistage interconnection network cannot be isolated, based on the traffic paths, to a single component of the multistage interconnection network, the second path data representing a modified configuration of the components of the multistage interconnection network to provide the traffic paths and test paths through the multistage interconnection network to facilitate identification of the single component without use of test signals; and
sending, from the first device to a second device, configuration data based on the second path data to initiate configuration of the multistage interconnection network.

18. The computer-readable storage device of claim 17, wherein the operations further comprise, based on failure statuses of the components, determining reliability metrics of the multistage interconnection network, a first reliability metric indicating a first average time between detecting faulty components during a first time period, a second reliability metric indicating a second average time between detecting faulty components during a second time period, a third reliability metric indicating a third average time between detecting a particular component of the components as faulty during a third time period, and a fourth reliability metric indicating a fourth average time between detecting the particular component as faulty during a fourth time period, wherein a particular failure status of the particular component indicates that the particular component was detected as faulty at a particular time.

19. A system comprising:
a transmitter; and
a resource manager configured to:
obtain traffic demand data indicating user traffic demand through a communication system including a multistage interconnection network;
generate first path data based on the traffic demand data, the first path data representing a configuration of components of the multistage interconnection network to provide traffic paths through the multistage interconnection network to accommodate the user traffic demand;
selectively generate second path data based on a determination that a potential failure of the multistage interconnection network cannot be isolated, based on the traffic paths, to a single component of the multistage interconnection network, the second path data representing a modified configuration of the components of the multistage interconnection network to provide the traffic paths and test paths through the multistage interconnection network to facilitate identification of the single component without use of test signals; and
send, via the transmitter to a device, configuration data based on the second path data to initiate configuration of the multistage interconnection network.

20. The system of claim 19, wherein the resource manager is configured to, based on failure statuses of the components, determine availability metrics of the multistage interconnection network, a first availability metric indicating a first percentage of a first time period during which the multistage interconnection network was available, a second availability metric indicating a second percentage of a second time period during which the multistage interconnection network was available, a third availability metric indicating a third percentage of a third time period during which a particular component of the components was available, and a fourth availability metric indicating a fourth percentage of a fourth time period during which the particular component was available.

* * * * *